(12) United States Patent
Steele et al.

(10) Patent No.: US 7,032,675 B2
(45) Date of Patent: Apr. 25, 2006

(54) THERMALLY-CONTROLLED VALVES AND METHODS OF USING THE SAME IN A WELLBORE

(75) Inventors: David Joe Steele, Irving, TX (US); Russell Irving Bayh, III, Carrollton, TX (US); Joseph D. Parlin, Plano, TX (US); Michael Wade Meaders, Pilot Point, TX (US); Dan P. Saurer, Richardson, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 237 days.

(21) Appl. No.: 10/681,020

(22) Filed: Oct. 6, 2003

(65) Prior Publication Data

US 2005/0072578 A1  Apr. 7, 2005

(51) Int. Cl.
*E21B 43/00* (2006.01)
(52) U.S. Cl. .................. 166/373; 166/386; 166/205; 166/303
(58) Field of Classification Search ................ 166/373, 166/386, 303, 205, 334.1, 334.4
See application file for complete search history.

(56) References Cited

U.S. PATENT DOCUMENTS

| | | | |
|---|---|---|---|
| 2,911,047 A | 11/1959 | Henderson | |
| 3,338,306 A | 8/1967 | Cook | |
| 3,420,302 A | 1/1969 | Edwards | |
| 3,456,722 A * | 7/1969 | Cornelius | ................. 166/64 |
| 3,493,050 A | 2/1970 | Kelley et al. | |
| 3,809,159 A | 5/1974 | Young et al. | |
| 3,908,763 A | 9/1975 | Chapman | |
| 3,994,340 A | 11/1976 | Anderson et al. | |
| 3,994,341 A | 11/1976 | Anderson et al. | |
| 4,020,901 A | 5/1977 | Pisio et al. | |
| 4,099,570 A | 7/1978 | Vandergrift | |
| 4,120,357 A | 10/1978 | Anderson | |
| 4,209,065 A * | 6/1980 | Ledent | ................. 166/64 |

(Continued)

FOREIGN PATENT DOCUMENTS

EP   0 697 315 A2   2/1996

(Continued)

OTHER PUBLICATIONS

Andersen, A., et al, "Feasibility Study of Shape Memory Alloys in Oil Well Applications," *Sintef Petroleum Research*, Jan. 1997, pp. 1-5, 58, 60, 63, 66-67, 83, 85-86.

(Continued)

*Primary Examiner*—William Neuder
(74) *Attorney, Agent, or Firm*—Rodney Carroll

(57) ABSTRACT

Methods of operating a downhole tool comprise thermally-controlling the tool by sensing a temperature and controlling the tool in response to the sensed temperature. Thermally-controlled downhole tools comprise a control element responsive to a change in temperature that control flow into, out of, or through a wellbore. Methods and systems for servicing a wellbore comprise using a thermally-controlled tool comprising a thermally-controlled valve (TCV) in a wellbore. The TCV includes a valve body comprising an injection port for allowing material to flow into or out of the wellbore and an opening/closing mechanism for regulating flow of the material through the injection port in response to a change in temperature. The valve body may be coupled to a downhole conduit. A plurality of TCV's may be arranged in the wellbore to control the injection of steam into the wellbore or the recovery of oil from the wellbore.

89 Claims, 9 Drawing Sheets

U.S. PATENT DOCUMENTS

| | | | |
|---|---|---|---|
| 4,248,376 A * | 2/1981 | Foller | 236/58 |
| 4,364,232 A | 12/1982 | Sheinbaum | |
| 4,619,320 A | 10/1986 | Adnyana et al. | 166/65.1 |
| 4,641,710 A | 2/1987 | Klinger | 166/303 |
| 4,678,039 A | 7/1987 | Rivas et al. | |
| 4,696,345 A | 9/1987 | Hsueh | |
| 4,765,410 A | 8/1988 | Rogers et al. | |
| 5,085,275 A | 2/1992 | Gondouin | 166/303 |
| 5,148,869 A | 9/1992 | Sanchez | |
| 5,199,497 A * | 4/1993 | Ross | 166/381 |
| 5,280,874 A * | 1/1994 | Zink et al. | 251/144 |
| 5,613,634 A | 3/1997 | Veronesi et al. | 236/101 |
| 5,860,475 A | 1/1999 | Ejiogu et al. | 166/245 |
| 5,957,202 A | 9/1999 | Huang | 166/272.3 |
| 6,016,868 A | 1/2000 | Gregoli et al. | |
| 6,053,992 A | 4/2000 | Wu et al. | 148/402 |
| 6,257,334 B1 | 7/2001 | Cyr et al. | 166/272.7 |
| 6,433,991 B1 | 8/2002 | Deaton et al. | 361/191 |
| 6,478,090 B1 * | 11/2002 | Deaton | 166/363 |
| 6,588,500 B1 | 7/2003 | Lewis | 166/61 |
| 6,607,036 B1 | 8/2003 | Ranson et al. | 166/302 |
| 6,622,794 B1 * | 9/2003 | Zisk, Jr. | 166/373 |
| 2003/0155111 A1 | 8/2003 | Vinegar et al. | 166/59 |
| 2003/0155113 A1 | 8/2003 | Mitchell et al. | 166/68.5 |

FOREIGN PATENT DOCUMENTS

| | | |
|---|---|---|
| EP | 0 697 315 A3 | 4/1998 |
| EP | 0 841 510 A1 | 5/1998 |
| EP | 0 841 510 B1 | 1/2002 |
| GB | 2 371 578 A | 7/2002 |
| GB | 2 385 078 | 8/2003 |

OTHER PUBLICATIONS

"Design of Fluid Systems, Steam Utilization," *Spirax Sarco*, 1951, pp. 1-8, 21-27, 68-71.

Doan, L.T., et al, "Performance of the SAGD Process in the Presence of Water Sand- A Preliminary Investigation," *Journal of Canadian Petroleum Technology*, Jan. 2003, vol. 42, No. 1, pp. 25-41.

Erlandsen, Sigurd, et al, "World's First Multiple Fiber Optic Intelligent Well," *World Oil*, Mar. 2003, vol. 224, No. 3, 8 pages.

Figure 9, Typical Steam Circuit, "Design of Fluid Systems: Steam Utilization," Spirax Sarco, Copyright 1985, p. 11.

Nasr, T.N., et al, "Novel Expanding Solvent-SAGD Process ES-SAGD," *Journal of Canadian Petroleum Technology*, Technical Note, 4 pages.

Nasr, T.N., et al, "SAGD Application In Gas Cap and Top Water Oil Reservoir, " *Journal of Canadian Petroleum Technology*, Jan. 6, 2003, pp. 32-38.

Potma, J., et al, "Thermal Horizontal Completions Boost Heavy Oil Production," *World Oil*, Feb. 2003, pp. 83-85.

Total Canada- Request for Proposal- SAGD Steam Diversion Systems, Methods, and Cost Estimate, 3 pages.

Walls, E., et al, "Residual Oil Saturation Inside the Steam Chamber During SAGD," *Journal of Canadian Petroleum Technology*, Jan. 2003, vol. 42, No. 1, pp. 39-47.

http://www.conocophillips.com/canada/news/032502_gas_bitumen.asp, Oct. 1, 2003, 2 pages.

http://www.conocophillips.com/canada/ops/surmont.asp, Oct. 1, 2003, 2 pages.

Fluid Injection into Tight Rocks, http://www.132.175.127.176/ngotp/projects/ngotp.cfm?Project ID=OGRT-010, Aug. 11, 2003.

P.C. McKenzie Company, "How does an Amot Thermostic Control Valve Work?" http://www.mckenziecorp.com/amot_valve.htm, Sep. 4, 2003.

Giuliani, C., et al; "Flow Rate Allocation in Smart Wells"; High-Tech Wells Conference, Feb. 11-13, 2003; Galveston.

1995 Press Release; "Halliburton Introduces Durasleeve For Easier Shifting, Better Seal and Lower Total Costs"; http://www.halliburton.com/news/archive/1995/hesnws_100995.jsp.; 1 page.

Flow Control—Systems and Products—Sliding Sleeves; Baker Hughes; http://www.bakerhughes.com/bot/completions/flow_control/products_sliding.htm.; 1 page.

Well Dynamics—Transforming Reservoirs Using SmartWell Technology, http://www.welldynamics.com/main.htm; 8 pages.

Steam Assisted Gravity Drainage (SAGD); Alberta Energy Research Institute; http://www.aeri.ab.ca/sec/suc_sto/suc_sto_001_2.cfm; 2 pages.

In Situ Technology, http://www.energy.gov.ab.ca/com/Sands/Royalty+Info/Royalty+Related+Info/The+Ne, 1 page.

North American Oil Reserves 2001; Alberta Energy Research Institute, http://www.energy.gov.ab.ca/cmn/docs/Oil_Reserves_2001.pdf; 2 pages.

BlackRock Seeks Approval to Develop Orion SAGD Project, http://www1.newswire.ca/releases/August2001/02/c6924.html.

* cited by examiner

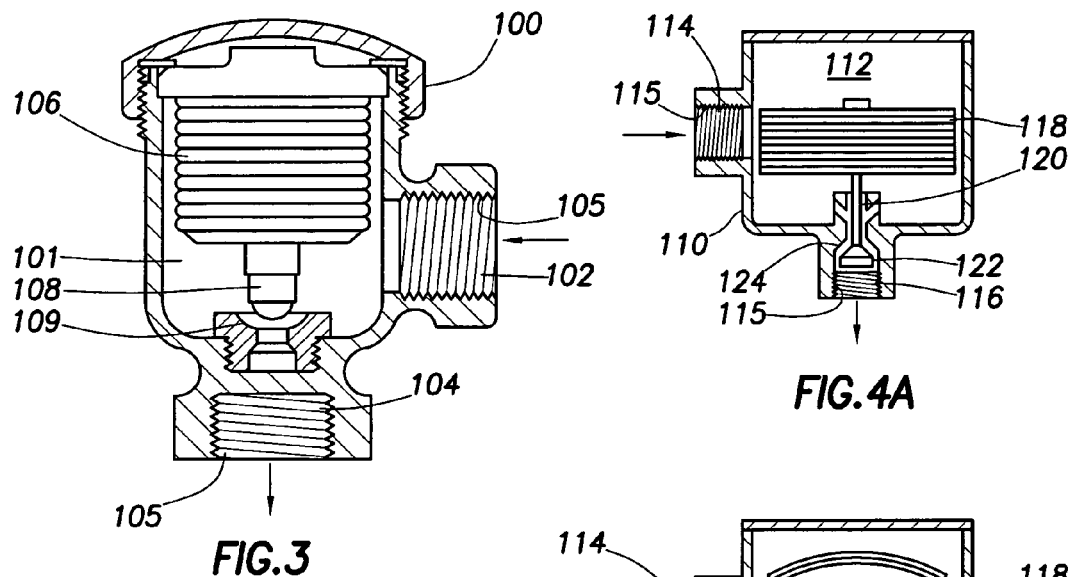
FIG.3
FIG.4A
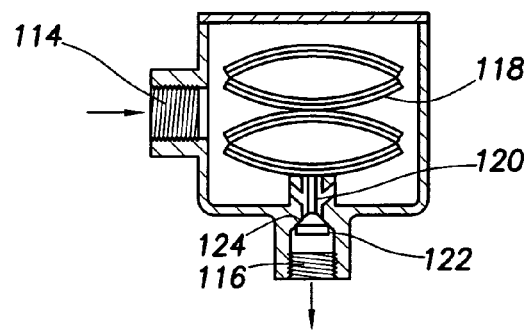
FIG.4B
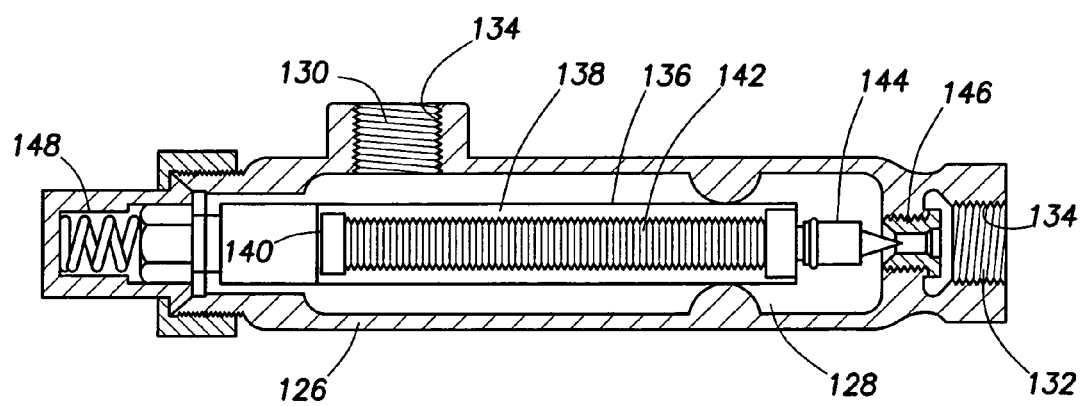
FIG.5

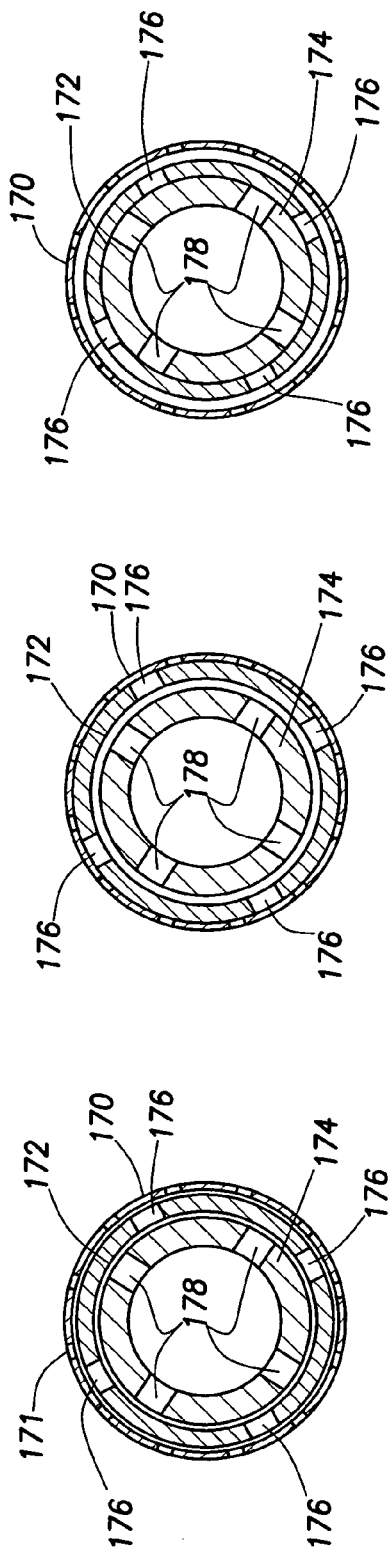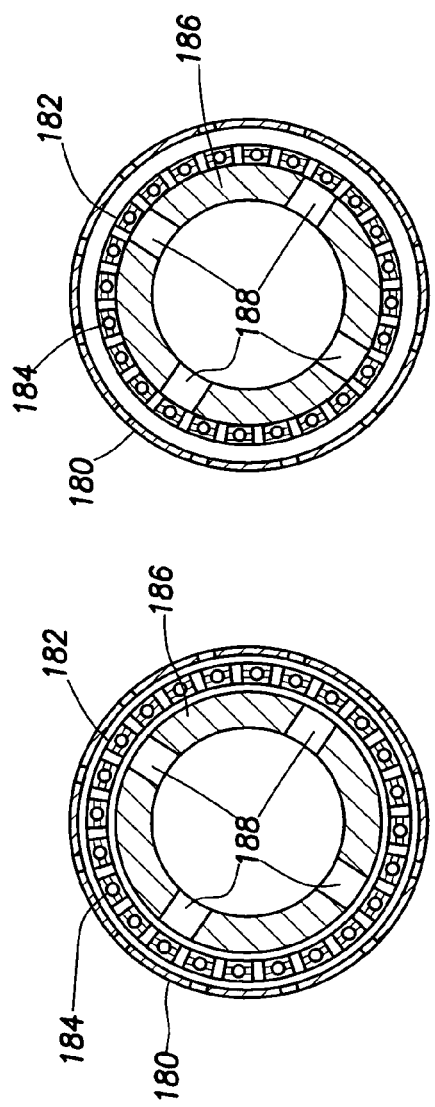

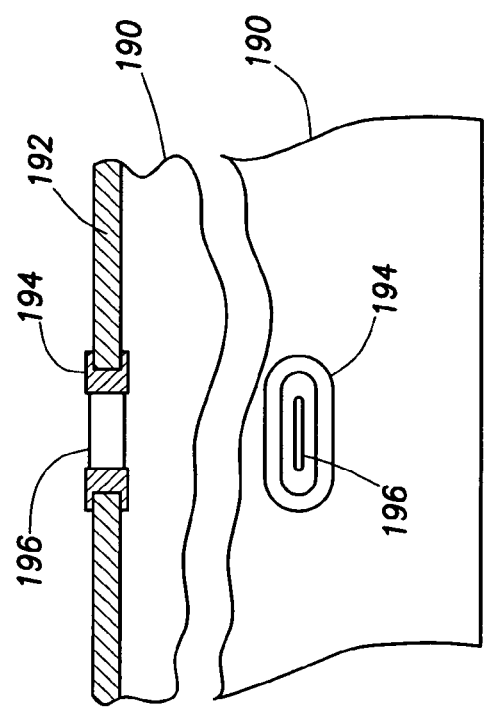
FIG.10A
FIG.10B
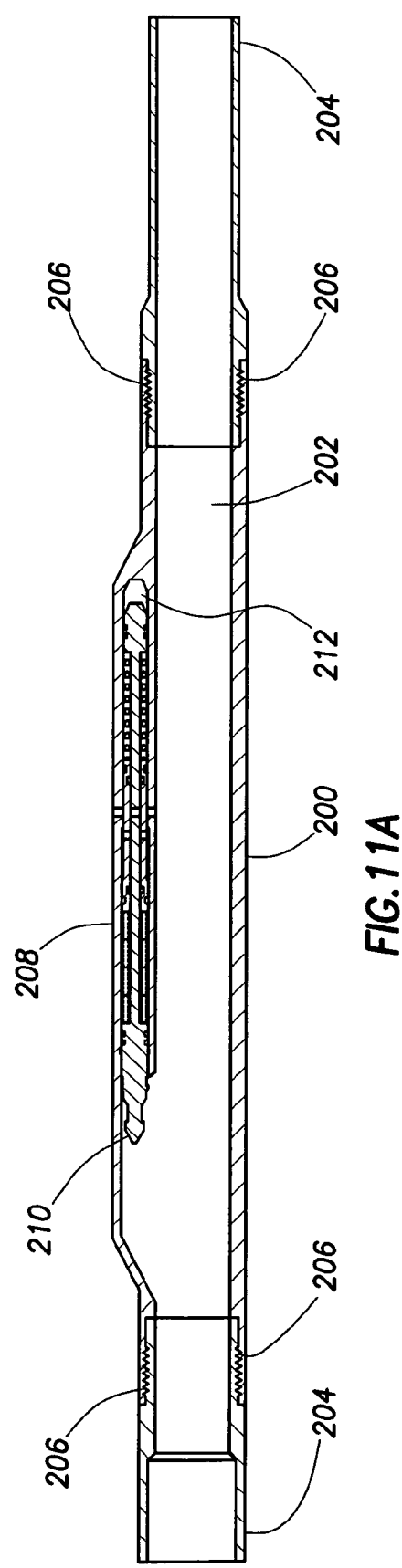
FIG.11A

THERMALLY-CONTROLLED VALVES AND METHODS OF USING THE SAME IN A WELLBORE

CROSS-REFERENCE TO RELATED APPLICATIONS

This application is related to commonly owned U.S. patent application Ser. No. 10/680,901, entitled "Loop Systems And Methods Of Using The Same For Conveying and Distributing Thermal Energy Into A Wellbore," filed on Oct. 6, 2003 and incorporated by reference herein.

FIELD OF THE INVENTION

This invention generally relates to the production of oil. More specifically, the invention relates to methods of using a thermally-controlled valve in a wellbore to regulate the flow of fluid such as steam into and out of the wellbore.

BACKGROUND OF THE INVENTION

Many reservoirs containing vast quantities of oil have been discovered in subterranean formations; however, the recovery of oil from subterranean formations has been very difficult due to the relatively high viscosity of the oil and/or the presence of viscous tar sands in the formations. In particular, when a production well is drilled into a subterranean formation to recover oil residing therein, often little or no oil flows into the production well even if a natural or artificially induced pressure differential exits between the formation and the well. To overcome this problem, various thermal recovery techniques have been used to decrease the viscosity of the oil and/or the tar sands, thereby making the recovery of the oil easier.

One such thermal recovery technique utilizes steam to thermally stimulate viscous oil production by injecting steam into a wellbore to heat an adjacent subterranean formation. However, the steam typically is not evenly distributed throughout the wellbore, resulting in a temperature gradient along the wellbore. As such, areas that are hotter and colder than other areas of the wellbore, i.e., hot spots and cold spots, undesirably form in the wellbore. The cold spots lead to the formation of pockets of oil that remain immobile. Further, the hot spots allow the steam to break through the formation and pass directly to the production well, creating a path of least resistance for the flow of steam to the production well. Consequently, the steam bypasses a large portion of the oil residing in the formation, and thus fails to heat and mobilize the oil. A need therefore exists to more evenly distribute the steam throughout the wellbore during its injection and to restrict the recovery of the steam, thereby reducing the amount of hot spots and cold spots in the wellbore.

SUMMARY OF THE INVENTION

According to an embodiment, methods of operating a downhole tool comprise thermally-controlling the tool by sensing a temperature and controlling the tool in response to the sensed temperature. In an embodiment, thermally-controlled downhole tools comprise a control element responsive to a change in temperature. The control element controls the flow of fluid into, out of, or through a wellbore. In one embodiment, the control element comprises a temperature sensor coupled to an actuator or an amplifier. In another embodiment, the control element comprises a mechanical element actuated by changes in temperature such as a thermally expandable material or one or more thermal expansion chambers. In an embodiment, thermally-controlled downhole tools may also comprise a thermally-controlled valve for controlling the flow of material downhole.

According to an embodiment, methods are provided for servicing a wellbore by using a thermally-controlled tool in a wellbore, for example, a steam assisted gravity drainage (SAGD) wellbore. The thermally-controlled tool comprises a thermally-controlled valve (TCV) for controlling the flow of material into, out of, or through the wellbore. A plurality of TCV's may be arranged in the wellbore to control the injection of steam into the wellbore. The steam injected into the wellbore heats oil in an adjacent subterranean zone, thereby decreasing the viscosity of the oil. As a result, the oil can be more easily conveyed from the subterranean zone to the surface of the earth during production of the oil. In another embodiment, a plurality of TCV's are arranged in a production conduit disposed in the wellbore to control the recovery of material from the wellbore. The TCV's may restrict the flow of steam out of the wellbore.

In an embodiment, thermally-controlled valves for regulating the flow of material in a wellbore comprise: a valve body comprising an injection port for allowing the material to flow into the wellbore; and an opening/closing mechanism for regulating flow through the injection port in response to a change in temperature. The opening/closing mechanism optionally may be located in a side pocket of the valve. The TCV's include connectors or threads for coupling the valve body to a downhole conduit or tool such as a steam delivery conduit or an oil production conduit. In another embodiment, systems for regulating the flow of material in a wellbore comprise a downhole conduit for conveying the material into an injection wellbore or out of a production wellbore and at least one thermally-controlled valve connected to the downhole conduit.

DESCRIPTION OF THE DRAWINGS

The invention, together with further advantages thereof, may best be understood by reference to the following description taken in conjunction with the accompanying drawing in which:

FIG. 3 depicts a balanced pressure thermostatic valve that may be used to control the injection of steam into a wellbore in accordance with an embodiment.

FIGS. 4A–4B depict a bimetallic valve that may be used to control the injection of steam into a wellbore in accordance with an embodiment.

FIG. 5 depicts a liquid expansion thermostatic valve that may be used to control the injection of steam into a wellbore in accordance with an embodiment.

FIGS. 8A–8C depict different embodiments of a concentric sleeve valve that may be used to control the injection of steam into a wellbore.

FIGS. 9A–9B depict different embodiments of a variable-orifice radial valve that may be used to control the injection of steam into a wellbore.

FIGS. 10A–10B depict different embodiments of a variable-orifice reed valve that may be used to control the injection of steam into a wellbore.

FIGS. 11A–11E depict different embodiments of a thermally-controlled valve comprising a side pocket for holding the brain of the valve.

DETAILED DESCRIPTION OF THE PREFERRED EMBODIMENTS

Figure 1A:
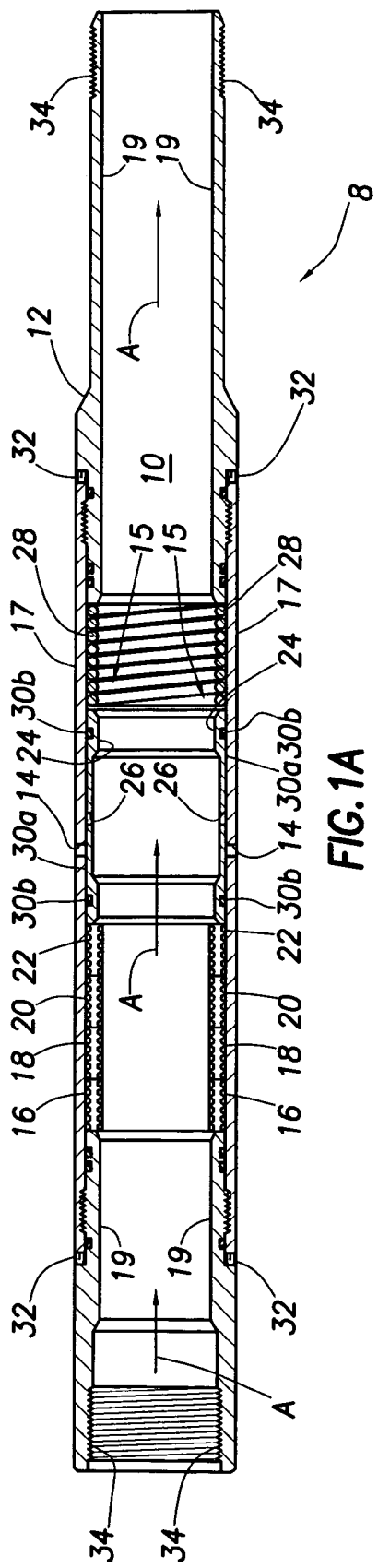
FIGS. 1A–1C depict embodiments of a thermally-controlled valve for controlling the injection of steam into a wellbore.

As used herein, a thermally-controlled downhole tool is defined as controlling a function of a tool disposed in a wellbore between first and second positions and intermediate positions therebetween, and vice versa, in response to changes in temperature. A control means is disposed downhole in situ with the tool. For example, controlling and/or sensing elements may be integral with the tool and thus may be contained within a tool housing. Also, the sensing and controlling elements may be separate or combined. The thermally-controlled tool may comprise a thermally-controlled valve (TCV) for controlling the production and/or injection of material such as steam downhole. The TCV is described in more detail below.

In an embodiment, a control signal is not transmitted from the surface. The temperature change is sensed downhole by the thermally-controlled tool, and the function of the tool is self-controlled accordingly. For example, the control element may comprise a mechanical element actuated by changes in temperature. The mechanical element may comprise a thermally expandable material, i.e., a material having a relatively high coefficient of thermal expansion. For example, the mechanical element may comprise a thermally expandable polymer, composite material, hydrocarbon-derived material, organic material, inorganic material, metal, bi-metal, or combinations thereof. An example of a suitable thermally expandable polymer is PEEK (polyetheretherketone), and an example of a suitable thermally expandable composite material is PEEK combined with glass fibers. PEEK is a high temperature resistant engineered thermoplastic having excellent chemical and fatigue resistance plus thermal stability. PEEK also exhibits excellent mechanical and electrical properties at high temperatures. Alternatively, the mechanical element may comprise one or more thermal expansion chambers that may be filled with an expanding and contracting fluid or solid. An example of a suitable fluid is antifreeze, which may be added to another liquid such as water. Examples of antifreeze include methyl alcohol, ethyl alcohol, and ethylene glycol, which may contain a phosphate, nitrate, or other anticorrosive agent. When water is mixed with antifreeze, both its freezing and boiling points are changed. For example, the mixture has a higher boiling point than just water alone. An example of a suitable solid for placement within the thermal expansion chambers is a wax material that expands and contracts in response to temperature changes. This wax material remains in a semi-solid state and is very sensitive to temperature changes. In an alternative embodiment, the control element may include a temperature sensor coupled to an actuator that may be mechanically driven, electrically driven, or hydraulically driven.

In another embodiment, the control element is capable of generating a digital or analog control signal that may be transmitted to the surface or other locales using, for example, electrical, hydraulic, and/or optical lines, for signaling the position of the tool and/or the temperatures being sensed by a temperature sensor. As such, electrical, fluidic, and/or optical logic and amplifiers such as a servomechanism may be employed to perform this task. A servomechanism refers to a device for controlling large amounts of power by means of very small amounts of input power. For example, the control element may send a signal to a power source in response to sensing the mechanical expansion of the thermal expansion chambers, and the power source may send an electrical signal via an electrical line to adjust the TCV. In alternative embodiments, control signals may be transmitted from the surface to an actuator of the tool that is mechanically, electrically, hydraulically, or optically driven or that produces a mechanical output (e.g., force/motion/torque/velocity/acceleration.), an electrical output, a hydraulic output, or an optical output. For example, the control signal may work in tandem with the thermal expansion device to control the valve. If an operator wants the valve to open or close at a slightly lower or higher temperature, the control signal could cool or heat the thermal expansion device slightly to shift its set point.

In yet another embodiment, a temperature sensor coupled to an actuator or a servomechanism senses a temperature change and responds by sending a signal (e.g., motion/movement/change-in-length) to an actuator. The actuator then responds by sending its own signal (e.g., electricity, hydraulic power, a light beam, or a digital or analog signal). If the actuator's signal is strong enough, it may directly adjust the TCV and thereby change the flow of material in the wellbore. The temperature sensor and the actuator may work together as a servomechanism to regulate such flow.

According to an embodiment, a downhole tool may be operated by thermally-controlling the tool. The tool may be controlled by, for example, sensing a temperature and controlling the tool in response to the sensed temperature. A function and/or element of the tool may then be actuated mechanically, electrically, or hydraulically. For example, the control element may send an electrical signal to activate the TCV in response to sensing a change in temperature in a manner similar to how a household thermostat electrically controls a furnace or air conditioning unit. Alternatively, the control element may send a signal to a hydraulic power unit, which would then use hydraulic fluid to activate the TCV. In another embodiment, control of the tool may be implemented by the thermal expansion of a mechanical element of the tool. The mechanical element may comprise a thermally expandable portion, e.g., a PEEK portion, a metal portion, or a bi-metallic portion, a TCV, one or more thermal expansion chambers filled with an expanding and contracting material, or combinations thereof.

As used herein, a thermally-controlled valve is defined as a device that is capable of regulating the flow of material into, through, and out of a wellbore in response to a change in temperature near the valve. In an embodiment, fluid outlets or ports in the valve are adjusted as the temperature changes. For example, the valve may be actuated between an open position, a closed position, and intermediate positions therebetween. In an embodiment, the valve comprises one or more ports, and the flow of fluid through the ports may be controlled by adjusting the size of the port in response to temperature changes.

In an embodiment, the TCV includes a valve body comprising an injection port for allowing material to flow into the wellbore and an opening/closing mechanism for regulating flow through the injection port in response to a change in temperature. The TCV may further include connectors for coupling the valve body to a downhole conduit for conveying material into or out of the wellbore. In an embodiment, the TCV may be threaded to mate with the downhole conduit.

According to an embodiment, the opening/closing mechanism of the TCV comprises a material that is capable of expanding and contracting to regulate flow through the injection port in response to changes in temperature as described previously. In another embodiment, the opening/closing mechanism comprises at least one expansion chamber as described previously that is capable of expanding and contracting in response to changes in temperature. The TCV also comprises a slidable sleeve near the expansion chamber that is capable of moving in response to the expansion and contraction of the expansion chamber. The opening/closing mechanism comprises an expandable member such as a spring or piston disposed near the end of the slidable sleeve opposite from the expansion chamber. The slidable sleeve may also be capable of moving in response to the expansion and contraction of the expandable member. In addition, the slidable sleeve comprises an opening such as a hole for controlling flow through the injection port by alignment or mis-alignment with the injection port. The slidable sleeve is adapted to increase flow through the injection port when a detected temperature is approximately equal to a set point temperature. It is further adapted to reduce flow through the injection port when a detected temperature is approximately less than or equal to a first set point temperature or greater than or equal to a second set point temperature.

In yet another embodiment, the opening/closing mechanism may include a left return port and a right return port in addition to the injection port. The left return port is laterally offset from a left side of the injection port while the right return port is laterally offset from a right side of the injection port. In other embodiments, the positions of the injection port and the right and left return ports relative to each may be interchanged. The hole in the slidable sleeve can be used to control the flow of fluid through the injection port and the left and right return ports by alignment and mis-alignment therewith. The slidable sleeve is adapted to increase flow through the left return port and reduce flow through the injection port and/or the right return port when a detected temperature is less than or equal to a set point temperature. The slidable sleeve is also adapted to increase flow through the injection port and reduce flow through the right return port and/or left return port when a detected temperature is approximately equal to a set point temperature. Further, the slidable sleeve is adapted to increase flow through the right return port and reduce flow through the injection port and/or the left return port when a detected temperature is approximately greater than or equal to a set point temperature. Each set point temperature for the above scenarios may be the same as or different from one or both of the other set point temperatures. Additional set points may be added to trigger other events to happen.

According to an embodiment, systems for regulating the flow of material in a wellbore include a downhole conduit for conveying material into, through, and/or from a wellbore and at least one TCV connected to the delivery conduit. Examples of suitable TCV's include, but are not limited to, the previously described TCV, a balanced pressure thermostatic valve such as a liquid expansion thermostatic valve, a vapor expansion thermostatic valve, a liquid and vapor expansion thermostatic valve, and a solid expansion thermostatic valve, a bimetallic valve, a bi-metal reed valve, a bi-metal sliding valve, a concentric sleeve valve, a variable-orifice radial valve, a variable-orifice reed valve, or combinations thereof.

In an embodiment, methods of servicing a wellbore include using a thermally-controlled tool comprising a TCV in the wellbore to control the injection of material into or the recovery of material from the wellbore. The wellbore may be arranged in any configuration suitable for injecting or recovering material from the wellbore, such as a steam-assisted gravity drainage (SAGD) configuration, a multilateral wellbore configuration, or a common wellbore configuration. A SAGD configuration comprises two independent wellbores with horizontal sections arranged one above the other. The upper wellbore is used primarily to convey steam downhole, and the lower wellbore is used primarily to produce oil. The wells are positioned close enough together to allow for heat flux from one to the other. Oil in a reservoir adjacent to the upper wellbore becomes less viscous in response to being heated by the steam such that gravity pulls the oil down to the lower wellbore where it can be produced. A multilateral wellbore configuration comprises two or more lateral wellbores extending from a single "parent" wellbore. The lateral wellbores are spaced apart from each other, wherein one wellbore may be used to convey steam downhole and the other wellbore may be used to produce oil. The multilateral wellbores may be arranged in parallel in various orientations such as vertically or horizontally and they may be spaced sufficiently apart to allow heat flux from one to the other. In the common wellbore configuration, a common wellbore may be employed to convey steam downhole and to produce oil. The common wellbore may be arranged in various orientations such as vertically or horizontally.

Examples of materials that the TCV may regulate the flow of include fluids such as steam and water. Such fluids may be heated to provide thermal energy to the wellbore. Other suitable materials include hydrocarbons such as naphtha, kerosene, and gasoline, and liquefied petroleum gas products, such as ethane, propane, and butane. Such materials may be employed in miscible slug tertiary recovery processes or in enriched gas miscible methods known in the art. Additional suitable materials include surfactants such as soaps, soap-like substances, solvents, colloids, or electrolytes. Such materials may be used for or in conjunction with miscellar solution flooding. Yet more suitable materials include polymers such as polysaccharides, polyacrylamides, and so forth. Such materials may be used to improve sweep efficiency by reducing the mobility ratio.

In an embodiment, a plurality of TCV's may be disposed in a delivery conduit that conveys steam into a wellbore for heating oil residing in a subterranean formation penetrated by the wellbore. The steam may be produced in a boiler located above or below the surface of the earth near the wellbore. The TCV's may be strategically arranged throughout the wellbore to achieve a substantially uniform temperature profile across the length of the wellbore. That is, the TCV's may be regulated such that TCV's at locations where the temperature has dropped below a specific set point increase the flow of steam into the wellbore and other TCV's at locations where the temperature has risen above a specific set point reduce the flow of steam into the wellbore. In alternative embodiments, power may be supplied to the TCV's using a hydraulic or electrical line running from the surface down to the brain. This power is not used to control the TCV's but instead acts to amplify the response of the brain to sensed temperature changes.

Using the TCV's in this manner to control the injection of steam into the wellbore reduces the amount of hot spots and cold spots that form in the wellbore. As such, the steam may flow into and become distributed throughout the subterranean formation, for example a tar sand formation. The steam thus heats a substantial portion, desirably the entire mass, of the oil in the subterranean formation, thereby sufficiently reducing the viscosity of the oil to stimulate the flow of the oil to a production wellbore and to the surface of the earth. In some cases, the pressure drop between the subterranean formation and the surface may be sufficient to naturally drive the oil to the surface. Alternatively, the oil may be artificially displaced to the surface by, for example, pumping the oil to the surface.

In another embodiment, a plurality of TCV's may be positioned throughout an oil production conduit disposed in a production well to regulate the recovery of material from the production well. The TCV's may be used, for example, to limit the intake of produced fluids such as oil, water, and steam into the production conduit to fluids having a temperature in a set point temperature range. For example, the TCV may be employed to prevent steam from being recovered, particularly steam that is hotter than desired. Otherwise, the production of such steam could exacerbate the problem of steam breaking through the subterranean formation to the production well.

Additional disclosure regarding the use of TCV's in a wellbore may be found in the copending patent application entitled "Loop Systems and Methods of Using the Same to Convey Steam into a Wellbore," filed concurrently herewith. It is understood that the embodiments depicted in the figures are only examples of how the TCV may be configured to inject steam into a wellbore. The TCV can be configured to regulate the flow of any material at a desired temperature into, through, and/or out of a wellbore.

Figure 1B:
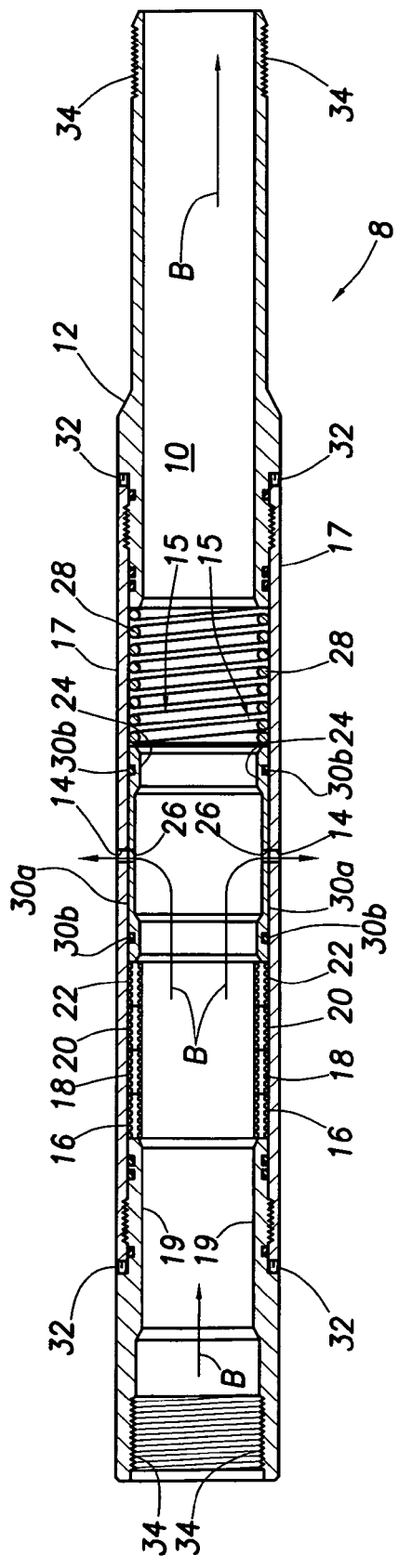
Figure 1C:
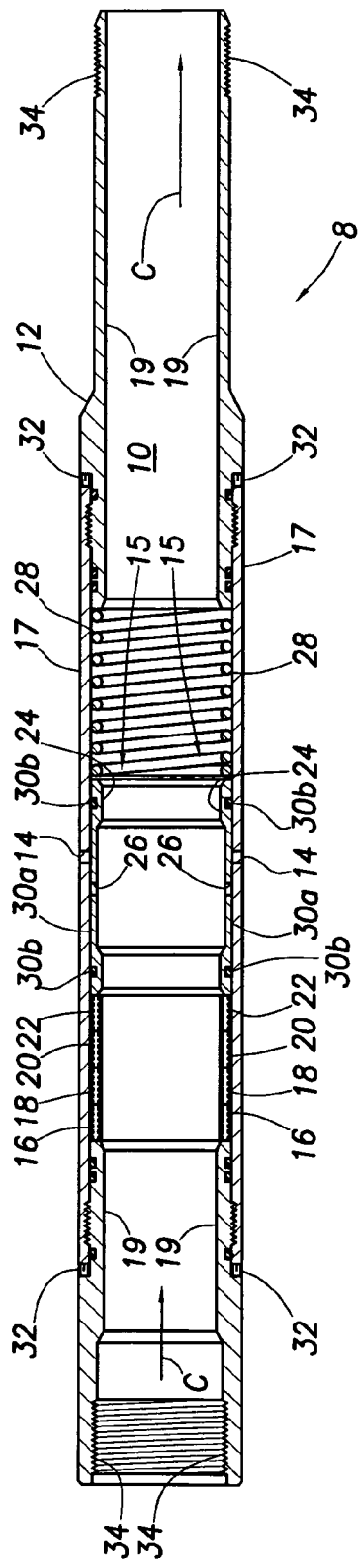

FIGS. 1A–1C illustrate three different operation modes of an embodiment of a TCV that does not require an external power source or signals from an outside source for its operation. The TCV 8 may be connected to a conduit such as a steam line (not shown) that conveys steam into the wellbore. The TCV 8 includes a valve body 12 having a flow passage 10 therethrough and one or more injection ports 14 through which the steam can flow from the steam line through valve body 12 into the wellbore. The valve body 12 may include connectors 19 with threaded regions 34, at either or both ends that mate with ends of the steam line to connect TCV 8 to the steam line. The TCV 8 further includes an opening/closing mechanism 15 for opening and closing injection ports 14 in response to changes in temperature. The opening/closing mechanism may be positioned adjacent to an outer section 17 of valve body 12 and between connectors 19 of valve body 12. The outer section 17 and the connectors 19 of valve body 12 are connected together via threads and locking screws 32 for ensuring that the threads do not unscrew. The opening/closing mechanism 15 comprises expansion chambers 16, 18, 20, and 22 adjacent to one connector 19 of valve body 12, a slidable sleeve 24 adjacent to the expansion chambers, and a spring 28 adjacent to an end of slidable sleeve 24 opposite from the expansion chambers. Spring 28 is also positioned adjacent to the other connector 19 of valve body 12, thereby placing a biasing force against slidable sleeve 24 and expansion chambers 16, 18, 20, and 22. The spring 28 is initially in its normal biasing position before steam is injected into the wellbore. In alternative embodiments, the expansion chambers and the spring may be substituted with other types of expandable members such as pistons.

The expansion chambers 16, 18, 20, and 22 may expand and contract in response to changes in temperature. It is understood that the number of expansion chambers could vary with the application and/or design of the TCV. They have flexible walls and are filled with a fluid, such as a liquid, a gas, or with a solid that may or may not change phase at a higher temperature. For example, expansion chambers 16, 18, 20, and 22 may be filled with different liquids having different boiling points. Thus, the liquids in expansion chambers 16, 18, 20, and 22 may vaporize when TCV 8 is heated to a temperature above their respective boiling points, causing the flexible walls to expand. The expansion chambers 16, 18, 20, and 22 may also contract if the temperature of TCV 8 falls below the respective boiling points of the gases therein, causing the gases to liquidize. The slidable sleeve 24 can move in response to the expansion and contraction of expansion chambers 16, 18, 20, and 22. Also, it comprises one or more holes 26 for controlling the flow of the steam through injection ports 14 by alignment or mis-alignment with injection ports 14. The holes 26 and injection ports 14 may have a special coating thereon (e.g., a nitride coating) or be made of a special material (e.g., tungsten carbide) to prevent erosion due to, for example, fluid cutting and/or wear. The TCV may also include a nut (not shown) that can be adjusted to cause movement of slidable sleeve 24 to close off injection ports 14 at a certain temperature. The adjustment nut is used to fine-tune the position of the sliding sleeve. For example if two expansion chambers are filled with an identical fluid but one chamber has slightly less fluid in it, this chamber would not expand as much as the other chamber. To ensure both chambers would open at the same time (and temperature), the adjustment nut of one chamber could be turned slightly to ensure that it would open at the same time as the other chamber.

The TCV may further include seals 30a that are interposed between outer section 17 and slidable sleeve 24 on the left and right side of holes 26 and/or injection port 14 for preventing fluid from leaking out through injection ports 14 when holes 26 are misaligned with injection port 14. The seals 30a may comprise close tolerance (i.e. sliding fit) components as shown, metal-to-metal seals, other known seals such as o-rings, vee-packing, and carbon fiber high temperature packing, or combinations thereof. Alternatively, seals 30a could include connecters for attachment to slidable sleeve 24 or outer section 17, or they could be molded to slidable sleeve 24 or outer section 17. In addition, debris barriers (or wipers) 30b such as o-rings are interposed between slidable sleeve 24 and outer section 17 for preventing fluid, scale, or debris from accumulating between valve body 12 and slidable sleeve 24.

In a first operation mode of TCV 8 shown in FIG. 1C, the temperature of a fluid entering TCV 8 is initially below or equal to a first set point temperature (e.g., 300° F.). This fluid originates from a boiler that converts water into steam; however, as the steam passes from the boiler to TCV 8 via a steam line, a portion of the steam may cool to below its boiling point temperature and condense. As such, the fluid passing through TCV 8 initially may contain primarily water and may eventually contain steam and mostly condensate. The temperature within TCV 8 is thus insufficient to cause the liquids within expansion chambers 16, 18, 20, and 22 to vaporize. Thus, slidable sleeve 24 remains in its original position. At this position, hole 26 is mis-aligned to the left of opening 14 such that TCV 8 is closed and does not release the fluid into the wellbore. The TCV 8 may be maintained in the closed position until the quality of the steam passing into TCV 8 improves and no longer contains undesirable amounts of condensate or water droplets, ensuring that it will adequately heat the oil in an adjacent subterranean formation.

As shown in FIG. 1B, once the temperature of the steam and the operation temperature of TCV 8 as affected by a surrounding temperature of the subterranean formation reach a first set point temperature (e.g., 300° F.), TCV 8 enters a second operation mode. By way of example, the liquid in the first two expansion chambers 16 and 18 vaporize, causing the walls of expansion chambers 16 and 18 to expand toward slidable sleeve 24. The expansion of chambers 16 and 18 thereby forces slidable sleeve 24 to move toward spring 28, which contracts in response to the force of slidable sleeve 24. As a result of the movement of slidable sleeve 24, hole 26 becomes aligned with injection port 14, thereby opening the port such that steam may pass therethrough. The steam within TCV 8 thus becomes injected into the wellbore where it can migrate into the subterranean formation and thermally stimulate the movement of oil therein. In an alternative embodiment, expansion chambers 16, 18, 20, and/or 22 may contain a material that does not go through a phase change at a particular temperature but instead expands at a near-linear rate as the temperature increases. In this case, the set point temperature may include a range of temperatures over which slidable sleeve 24 gradually shifts open and closed.

At some point, the steam within TCV 8 may reach a second set point temperature (e.g., about 500° F.) higher than the first set point temperature. To avoid the formation of hot spots within the wellbore, the injection of such hot steam into the wellbore is stopped by the TCV 8 switching to a third operation mode depicted in FIG. 1A. By way of example, the liquids within expansion chambers 20 and 22 vaporize such that chambers 20 and 22 expand toward slidable sleeve 24. The force applied against slidable sleeve 24 by expansion chambers 20 and 22 causes slidable sleeve 24 to advance further, compressing spring 28 even more. As a result of the movement of slidable sleeve 14, hole 26 becomes mis-aligned to the right of injection port 14 such that injection port 14 becomes blocked, thereby closing TCV 8. Thus, the hot steam within TCV 8 no longer can flow into the wellbore but can flow downstream through the steam line to other TCV's. If the temperature of the steam cools back to below the second set point temperature, the gases within expansion chambers 20 and 22 condense, resulting in the contraction of those chambers. Consequently, the force applied by slidable sleeve 24 against spring 28 drops, allowing spring 28 to expand and push slidable mechanism 24 back toward the expansion chambers. In this manner, TCV 8 may switch back to the second operation mode. In a similar manner, TCV 8 can switch back to the first operation mode when the temperature falls below the first set point temperature such that the gases within expansion chambers 16 and 18 condense.

Figure 2A:
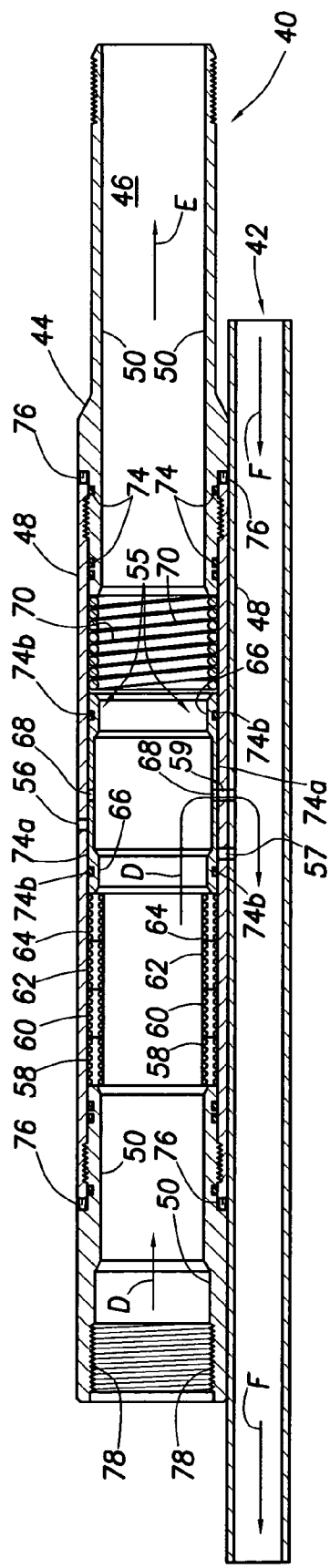
FIGS. 2A–2C depict embodiments of a thermally-controlled valve for controlling both the injection of steam into a wellbore and the injection of condensate into a return line that exits the wellbore.
Figure 2B:
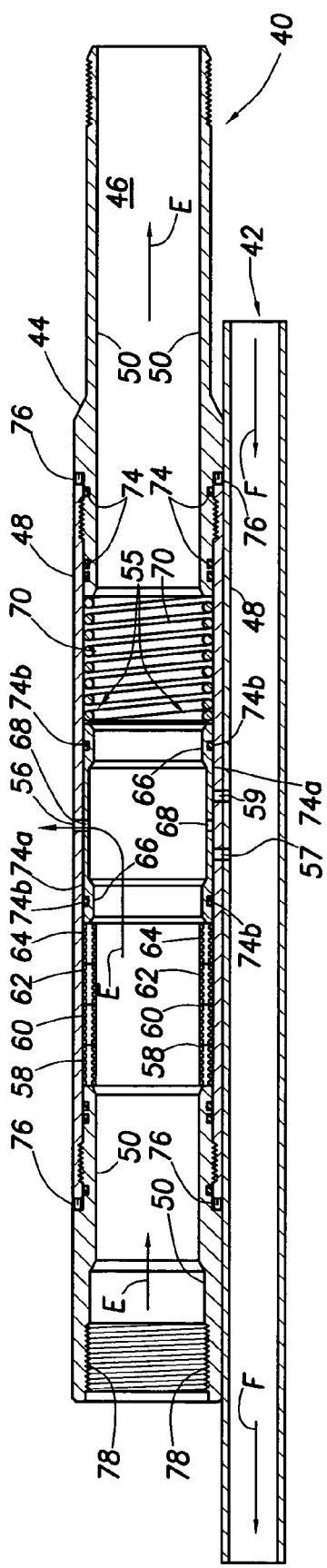
Figure 2C:
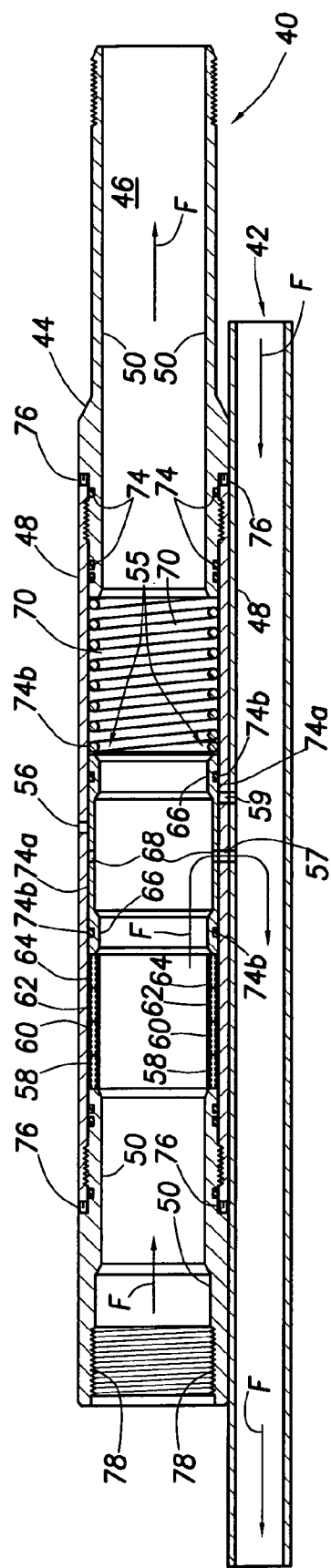

FIGS. 2A–2C illustrate three different operation modes of yet another embodiment of a TCV suitable for injecting steam into a wellbore. This embodiment of the TCV is similar to the embodiment depicted in FIGS. 1A–1C. Like TCV 8, TCV 40 may be connected to a conduit such as a steam line (not shown) for conveying steam from a boiler into the wellbore. Unlike TCV 8, the base of TCV 40 is also connected to another conduit such as a return line 42 for conveying condensate from the wellbore back to the boiler where it can be heated and vaporized for reuse. The TCV 40 includes a valve body 44 having a flow passage 46 therethrough and one or more injection ports 56 through which the steam can flow from the steam line through valve body 44 into the wellbore. Valve body 44 further includes one or more left and right return ports 57 and 59 through which the condensate and too hot steam can flow from the steam line into return line 42. Left return port 57 is laterally offset from the left side of injection port 56, and right return port 59 is laterally offset from a right side of injection port 56. The valve body 44 may also include connectors 50 with threaded regions 78, at either or both ends that mate with the steam line to connect TCV 40 to the steam line. The return line 42 may also include connectors or threads for mating with other conduits or tools.

The TCV 40 further includes an opening/closing mechanism 55 for opening and closing injection port 56 and return ports 57 and 59 in response to changes in temperature. The opening/closing mechanism 55 may be positioned adjacent to an outer section 48 of valve body 44 and between connectors 50. The outer section 48 and the connectors 50 of valve body 44 are connected together via threads and locking screws 76 for ensuring that the threads do not unscrew. The opening/closing mechanism 55 comprises expansion chambers 58, 60, 62, and 64 adjacent to one connector 50 of valve body 44, a slidable sleeve 66 adjacent to the expansion chambers, and a spring 70 adjacent to an end of slidable sleeve 66 opposite from the expansion chambers. Spring 70 is also positioned adjacent to the other connector 50 of valve body 44, thereby placing a biasing force against slidable sleeve 66 and expansion chambers 58, 60, 62, and 64. The spring 70 is initially in its normal biasing position when TCV 40 before steam is pumped through valve body 44. In alternative embodiments, the expansion chambers and the spring may be substituted with other types of expandable members such as pistons.

The expansion chambers 58, 60, 62, and 64 may expand and contract in response to changes in temperature. It is understood that the number of expansion chambers could vary with the application and/or design of the TCV. They have flexible walls and are filled with a fluid, such as a liquid, a gas, or a solid that may or may not change phase at a higher temperature. For example, the expansion chambers 58, 60, 62, and 64 may be filled with different liquids having different boiling points. Thus, the liquids in expansion chambers 58, 60, 62, and 64 may vaporize when TCV 40 is heated to a temperature above their respective boiling points, causing the flexible walls to expand. The expansion chambers 58, 60, 62, and 64 may also contract if the temperature of TCV 40 falls below the respective boiling points of the gases therein, causing the gases to liquidize. The slidable sleeve 66 can move in response to the expansion and contraction of expansion chambers 58, 60, 62, and 64. Also, it comprises a hole 68 for controlling the flow of the steam through injection port 56 by alignment or mis-alignment therewith and for controlling the flow of steam and/or condensate through return ports 57 and 59 by alignment or mis-alignment therewith. The hole 68 and ports 56, 57, and 59 may have a special coating thereon (e.g., a nitride coating) or be made of a special material (e.g., tungsten carbide) to prevent erosion due to, for example, fluid cutting and/or wear). The TCV may also include a nut (not shown) that can be adjusted to cause movement of slidable sleeve 66 to close off injection port 56 at a certain temperature.

The TCV may further include seals 74a that are interposed between outer section 48 and slidable sleeve 66 on the left and right side of holes 68 and/or injection port 56 for preventing fluid from leaking out through injection ports 56 when holes 68 are misaligned with injection ports 56. The seals 74a may comprise close tolerance (i.e. sliding fit) components as shown, metal-to-metal seals, other known seals such as o-rings, vee-packing, and carbon fiber high temperature packing, or combinations thereof. Alternatively, seals 74a could include connecters for attachment to slidable sleeve 66 or outer section 48, or they could be molded to slidable sleeve 66 or outer section 48. In addition, debris barriers (or wipers) 74b such as o-rings are interposed between slidable sleeve 66 and outer section 48 for preventing fluid, scale, or debris from accumulating between outer section 48 and slidable sleeve 66.

In a first operation mode of TCV 40 shown in FIG. 2C, the temperature of a fluid entering TCV 40 is initially below a first set point temperature (e.g., 300° F.). This fluid originates from a boiler that converts water into steam; however, as the steam passes from the boiler to TCV 40 via a steam line, a portion of the steam may cool to below its boiling point temperature. As such, the fluid passing through TCV 40 initially may contain primarily water and may eventually contain steam and mostly condensate. By way of example, the temperature within TCV 40 is thus insufficient to cause the liquids within expansion chambers 58, 60, 62, and 64 to vaporize. Thus, in the first operation mode, slidable sleeve 66 remains in its original position. At this position, hole 68 is aligned with left return port 57 and thus allows the condensate and cool steam within TCV 40 to flow into return line 42. The hole 68 is also mis-aligned to the left of injection port 56 and thus prevents the condensate and cool steam within TCV 40 from flowing into the wellbore and creating cold spots therein. In addition, hole 68 is mis-aligned with right return port 59.

As shown in FIG. 2B, once the temperature of the steam and the operation temperature of TCV 40 as affected by a surrounding temperature of the subterranean formation reach the first set point temperature (e.g., about 300° F.), TCV 40 enters a second operation mode. By way of example, the liquid in the first two expansion chambers 58 and 60 vaporize, causing the expansion chambers to expand toward slidable sleeve 66. The expansion of chambers 58 and 60 thereby forces slidable sleeve 66 to move toward spring 70, which contracts in response to the force of slidable sleeve 66. As a result of the movement of slidable sleeve 66, hole 68 becomes aligned with injection port 56, thereby allowing steam to pass through injection port 56. At least a portion of the steam within TCV 40 thus becomes injected into the wellbore where it can migrate into the subterranean formation and thermally stimulate the movement of oil therein. In addition, hole 68 becomes mis-aligned with right and left return ports 57 and 59, thus preventing the steam within TCV 40 from entering return line 42. The steam may also flow downstream through the steam line to other TCV's. In an alternative embodiment, expansion chambers 16, 18, 20, and/or 22 may contain a material that does not go through a phase change at a particular temperature but instead expands at a near-linear rate as the temperature increases. In this case, the second set point temperature may include a range of temperatures over which slidable sleeve 66 gradually shifts open and closed.

At some point, the steam within TCV 40 may reach a second set point temperature higher than the first set point temperature (e.g., 500° F.). To avoid the formation of hot spots within the wellbore, the injection of such hot steam into the wellbore is stopped by the TCV 40 switching to a third operation mode depicted in FIG. 2A. By way of example, the liquids within expansion chambers 62 and 64 vaporize such that the chambers expand toward slidable sleeve 66. The force applied against slidable sleeve 66 by expansion chambers 62 and 64 causes slidable sleeve 66 to advance further, compressing spring 70 even more. As a result of the movement of slidable sleeve 66, hole 68 becomes mis-aligned to the right of injection port 56, thereby closing injection port 56 and preventing the hot steam within TCV 40 from passing into the wellbore. Hole 68 further becomes aligned with right return port 59 and mis-aligned with left return port 57. As such, the hot steam may flow into return line 42 via right return port 59 rather than left return port 57. The steam can also flow downstream through the steam line to other TCV's, cooling to the set point temperature on its way.

If the temperature of the steam within TCV 40 cools back to below the second set point temperature, the gases within expansion chambers 62 and 64 condense, resulting in the contraction of those chambers. Consequently, the force applied by slidable sleeve 66 against spring 70 drops, allowing spring 70 to expand and push slidable mechanism 66 back toward the expansion chambers. In this manner, TCV 40 may switch back to the second operation mode. In a similar manner, TCV 40 can switch back to the first operation mode when the temperature falls below the first set point temperature such that the gases within expansion chambers 58 and 60 condense.

FIG. 3 illustrates a balanced pressure thermostatic valve that may be employed as a downhole TCV for controlling the flow of steam and condensate. The valve comprises a housing 100 having an inlet 102, an outlet 104, and a flow passage 101 therethrough. The inlet 102 and the outlet 104 may include connectors such as threads 105 for coupling the valve to one or more conduits and/or downhole tools. For example, inlet 102 may be coupled to a steam line, and outlet 104 may be coupled to a condensate return line. The valve further comprises a thermally expandable member 106, e.g., a corrugated metal bellow, a sealing member 108, and a seat 109 for receiving sealing member 108. The top of expandable member 106 may be firmly fixed to allow expansion or contraction to take place at the bottom of the valve to move sealing member 108 onto or off of seat 109. The expandable member 106 may be filled with, for example, an alcohol mixture that has a boiling point lower than that of water. When steam initially flows in through inlet 102, sealing member 108 is not on seat 109 such that air flows out through outlet 104, followed by a cooler condensate. As the condensate gradually warms up, heat is transferred to the alcohol mixture in expandable member 106. Before the condensate reaches its boiling point, the alcohol mixture reaches its boiling point. As soon as the alcohol mixture boils, it gives off vapor, increasing the pressure inside of expandable member 106. This pressure exceeds the pressure inside the valve body such that expandable member 106 expands and forces sealing member 108 onto its seat 109, thereby closing the valve. The steam thus cannot escape into the condensate return line but can instead be conveyed into the wellbore through another outlet (not shown).

Turning to FIGS. 4A–4B, a bimetallic valve that may also be employed as a downhole TCV is shown. The valve includes a housing 110 having an inlet 114, an outlet 116, and a flow passage 112 therethrough. It may also include connectors such as threads 115 for coupling the valve to one or more conduits and/or downhole tools. For example, inlet 114 may be coupled to a steam line, and outlet 116 may be coupled to a condensate return line. A thermally expandable member 118, e.g., a bimetallic element, a sealing member 122, a stem 120 for connecting expandable member 118 to sealing member 122, and a seat 124 for receiving sealing members 122 are disposed within housing 110. Fluid may enter the bimetallic valve via inlet 114. FIG. 4A shows the bimetallic valve when outlet 116 is open, and FIG. 4B shows the bimetallic valve when outlet 116 is closed. When steam initially flows into inlet 114, it initially forms condensate that cools expandable member 118. The steam pressure causes expandable member 118 to push sealing member 122 away from its seat 124, thereby opening outlet 116 to allow the condensate to flow into a condensate return line. Eventually the steam warms up to a temperature at which it contains no condensate. The higher temperature of the steam causes expandable member 118 to pull sealing member 122 toward its seat 124, thereby closing outlet 116 to prevent steam from being released into the condensate return line. Instead, the steam may be conveyed through another outlet (not shown) into a wellbore.

FIG. 5 depicts a liquid expansion thermostatic valve that may be employed as a downhole TCV for controlling the flow of condensate and steam. The valve includes a housing 126 having an inlet 130, an outlet 132, a flow passage 128 therethrough, and connectors such as threads 134 for coupling inlet 130 and outlet 132 to one or more downhole conduits and/or tools such as a steam line and a condensate return line. The valve is operated by the expansion and contraction of a thermostatic element 136 that responds to the temperature difference between steam and condensate. The valve also includes a free moving piston 140 having a piston rod 142, a sealing member 144 fixed on the end of piston rod 142, and a seat 146 for receiving sealing member 144. The thermostatic element 136 is filled with an oil 138 that is in contact with piston 140. When steam initially flows into the valve through inlet 130, condensate forms at a steady rate. The sealing member 144 is positioned to allow air and just this amount of condensate to pass through outlet 132. However, if the amount of condensate being formed increases, it becomes backed up in the valve before outlet 132 where it cools off. The cooler condensate causes oil 138 to contract and cause piston 140 to force sealing member 144 away from its seat 146, thus allowing the greater volume of condensate to be discharged. On the contrary, when the quantity of condensate in the valve decreases, more steam contacts thermostatic element 136, thus transmitting heat to oil 138 such that it expands. This expansion acts on piston 140 to cause sealing member 144 to be pushed nearer and nearer to its seat 146, steadily reducing the flow of the condensate. The sealing member 144 may thus close off completely before the steam can pass into a condensate return line, allowing the steam to instead be conveyed through another outlet (not shown) into a wellbore. The valve may also be adjusted by a nut 148 such that sealing member 144 is pushed against its seat 146 after a certain amount of oil expansion has taken place. As such, the valve can be set to close off at a certain temperature.

Figure 6:
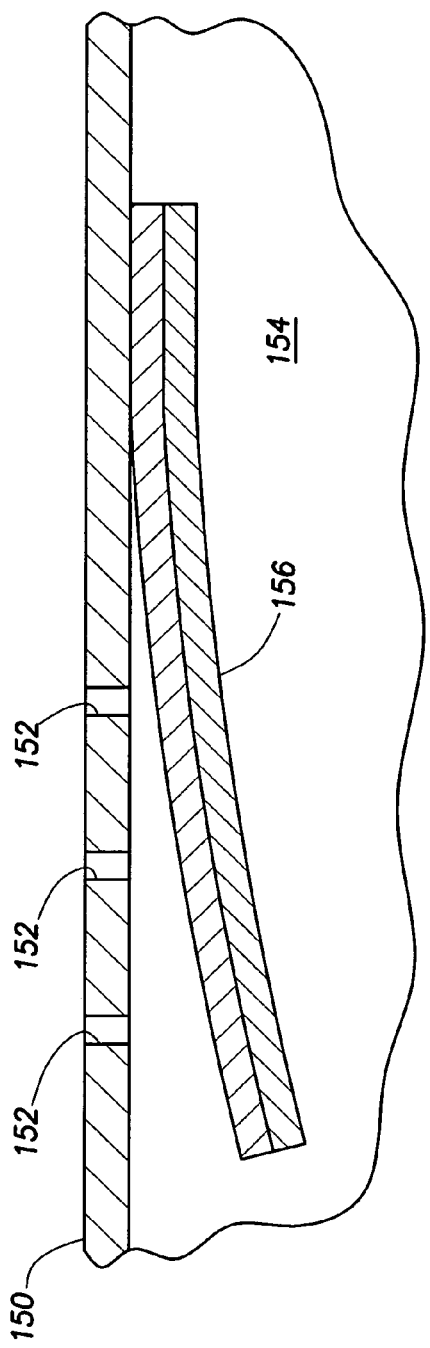
FIG. 6 depicts a bi-metal reed valve that may be used to control the injection of steam into a wellbore in accordance with an embodiment.

FIG. 6 depicts another TCV, i.e., a bi-metal reed valve, which may be employed downhole for controlling the flow of steam and condensate. The TCV comprises a housing 150 having ports 152, a flow passage 154 within housing 150, and a sealing member such as a bi-metal reed 156 fixed to housing 150. When steam is initially passed into the valve, air and condensate pass freely out of ports 152 into a condensate return line. Then as bi-metal reed 156 approaches the temperature of the steam, its free end bends upward and eventually closes ports 152. The passage of the steam into a condensate return line is thus blocked, and the valve may allow steam to flow through other outlets (not shown) into a wellbore when its temperature has reached a set point temperature (e.g., 300° F.). The ports 152 remain closed until the valve fills with condensate that cools bi-metal reed 156 sufficiently to cause it to bend downward, thereby opening ports 152.

Figure 7:
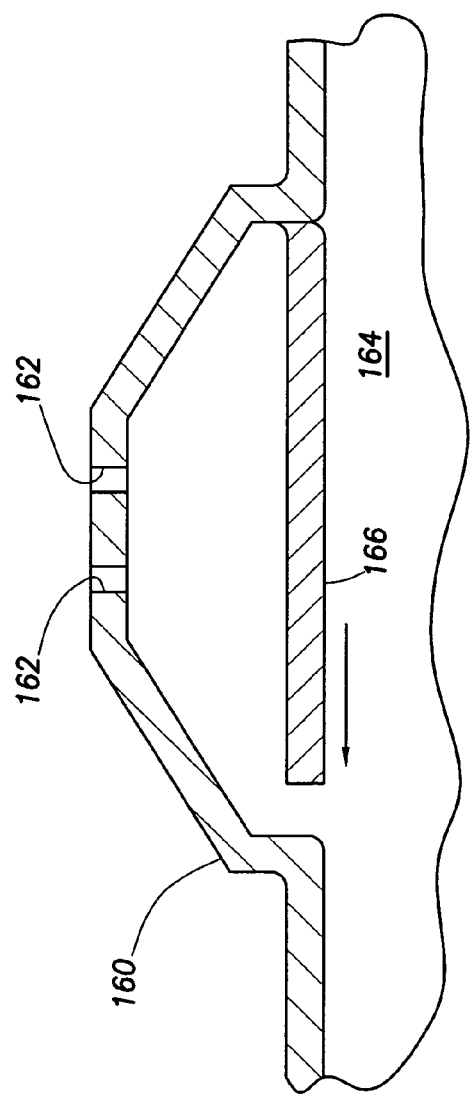
FIG. 7 depicts a bi-metal sliding valve that may be used to control the injection of steam into a wellbore in accordance with an embodiment.

Turning to FIG. 7, yet another TCV, i.e., a bi-metal sliding valve, is depicted that may be used downhole to regulate the flow of steam and condensate. The TCV comprises a housing 160 having ports 162, a flow passage 164 within housing 160, and a thermally expandable member 166 such as a bi-metal strip at the neck of the valve. When steam is initially passed into the valve, air and condensate pass freely out of ports 162 into a condensate return line. Then as expandable member 166 approaches the temperature of the steam, it expands and eventually closes the neck of the valve, thus preventing the steam from exiting ports 162. The valve remains closed until it fills with condensate that cools expandable member 166 sufficiently to cause it contract and open the neck of the valve, allowing the condensate to flow through ports 162.

FIGS. 8A–8C illustrate three modes of another embodiment of a TCV that may be utilized downhole to control the flow of condensate and steam. The TCV includes a protective housing or shroud 170 surrounding an expandable ring 172 having a relatively high coefficient of thermal expansion and an inner mandrel 174. The TCV further includes outer ports 171 and 176 and inner ports 178 through which fluid may flow from the TCV into a wellbore. As shown in FIG. 8C, when a temperature near the TCV is below or equal to a first set point temperature (e.g., 300° F.), expandable ring 172 is in a contracted state where it blocks inner ports 178, thereby preventing the condensate from entering the wellbore. As shown in FIG. 8B, when a temperature near the TCV is greater than or equal to a second set point temperature (e.g., 500° F.), expandable ring 172 expands such that it blocks outer ports 171. As such, hot steam is prevented from entering the wellbore. Further, as shown in FIG. 8A, when a temperature near the TCV is within a predetermined temperature range between the first and second set points, expandable ring 172 blocks neither outer ports 171 nor inner ports 178 and thus allows the steam to flow into the wellbore.

FIGS. 9A–9B illustrate a TCV that may be used downhole to control the flow of condensate and steam and to prevent sand from being produced along with oil in a wellbore. The TCV includes a protective housing or shroud 180, a mesh screen 184, and a conduit 186 having ports 188. Mesh screen 184 allows fluids to pass therethrough but blocks solid particles such as sand. In addition, the TCV includes an expandable material 182 interposed between protective housing 180 and mesh screen 184 that has a relatively high coefficient of thermal expansion. The expandable material 182 may be bounded to mesh screen 184 or to a ring or conduit for holding expandable material 182. The TCV may be operated in accordance with either or both of the following methods: 1) gaps in expandable material 182 and/or in mesh screen 184 may open and close in response to changes in temperature, thereby regulating the flow of fluid through the gaps; and 2) expandable material 182 contracts to restrict flow through ports 188 or expands to allow flow through ports 188. FIG. 9A shows expandable material 182 in an expanded state, and FIG. 9B shows expandable material 182 in a contracted state.

FIG. 10A depicts a cross-sectional view and FIG. 10B depicts a top down view of another TCV that may be employed to regulate the flow of fluid such as steam, condensate, or oil. The TCV includes a housing 190, a conduit 192 bonded to an expandable material 194, e.g., production tubing, having one or more ports 196 in communication with, e.g., a wellbore. The expandable material 194 may have a relatively high coefficient of thermal expansion such that it expands and contracts a lot in response to changes in temperature. When the temperature in the TCV is greater than or equal to a set point temperature at which steam could generate a hot spot in a wellbore, expandable material 194 may expand to cause each port 196 to close and block the passage of fluid into a wellbore. Otherwise, expandable material 194 may be in a contracted state such that each port 196 is open to allow steam at a temperature below the set point temperature to pass into the wellbore.

As shown in FIG. 11A, the TCV may also be configured with a side pocket mandrel for holding a unit comprising the primary elements of the TCV, wherein this unit is hereinafter referred to as the "brain" of the TCV. Positioning the brain in a side pocket provides for accessibility through the TCV below the side pocket such that other components such as other TCV's in conduit can be easily accessed. Further, the brain can be retrieved from a wellbore for repairs, maintenance, replacement, and/or a set point change. The brain may be removed and replaced with another brain, if desired, by lowering a tool deployed on wireline or coiled tubing into the wellbore through the delivery conduit. A tool shaped to fit around the end of the brain could be used to hold the brain as it is being retrieved from or lowered into the wellbore. Fiber optic cable could be placed along the wellbore on the outside of the steam line to detect the temperature along the entire length of the wellbore. Alternatively, temperature sensors could be placed along the wellbore. Such temperature monitoring methods could be used to indicate when a brain needs to be replaced with another one having different set points.

According to an embodiment, the TCV depicted in FIG. 11A includes a valve body 200 having a flow passage 202 through which material can pass. The valve body 200 may be connected to a conduit such as a steam line using connectors 204 such as male-female connectors having threads 206 for attaching connectors 204 to the conduit (not shown). A portion 208 of valve body 200 extends out past the rest of valve body 200 and forms a U-shaped recess, i.e., a side pocket 212, for holding a brain 210 of the TCV. The brain 210 includes the primary elements of the TCV and controls the flow of fluid into a wellbore.

Figure 11B:
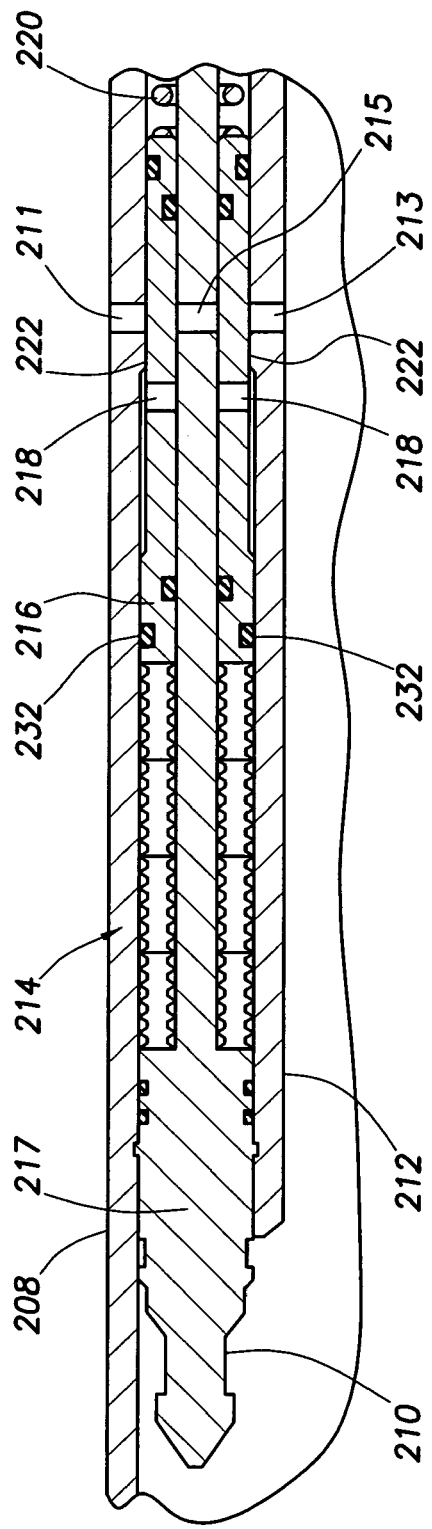
Figure 11C:
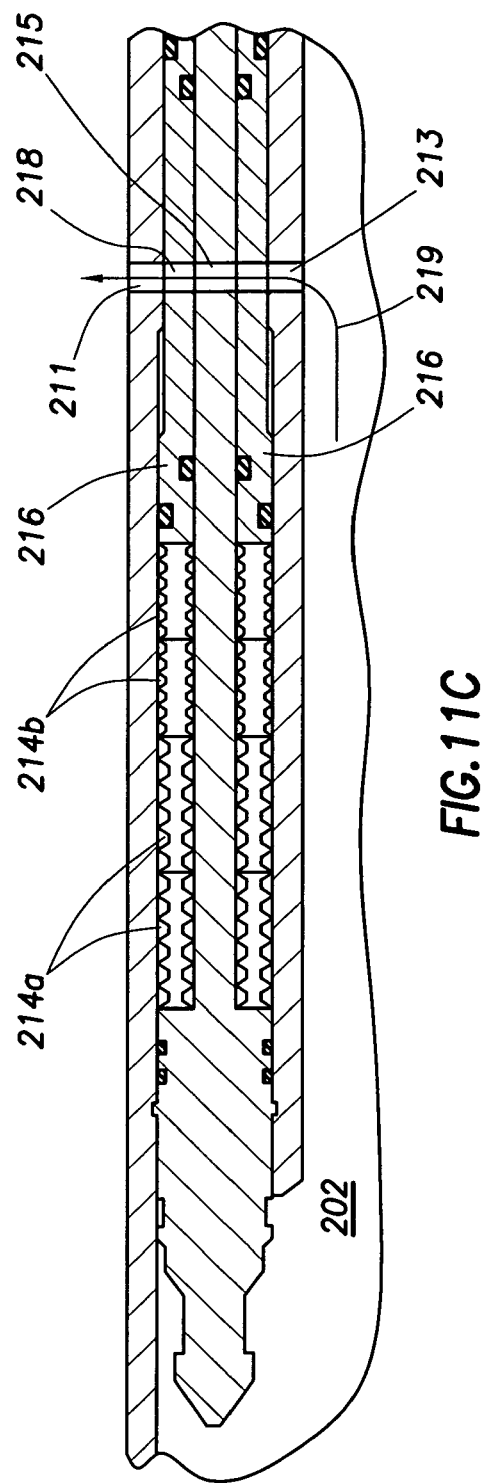
Figure 11D:
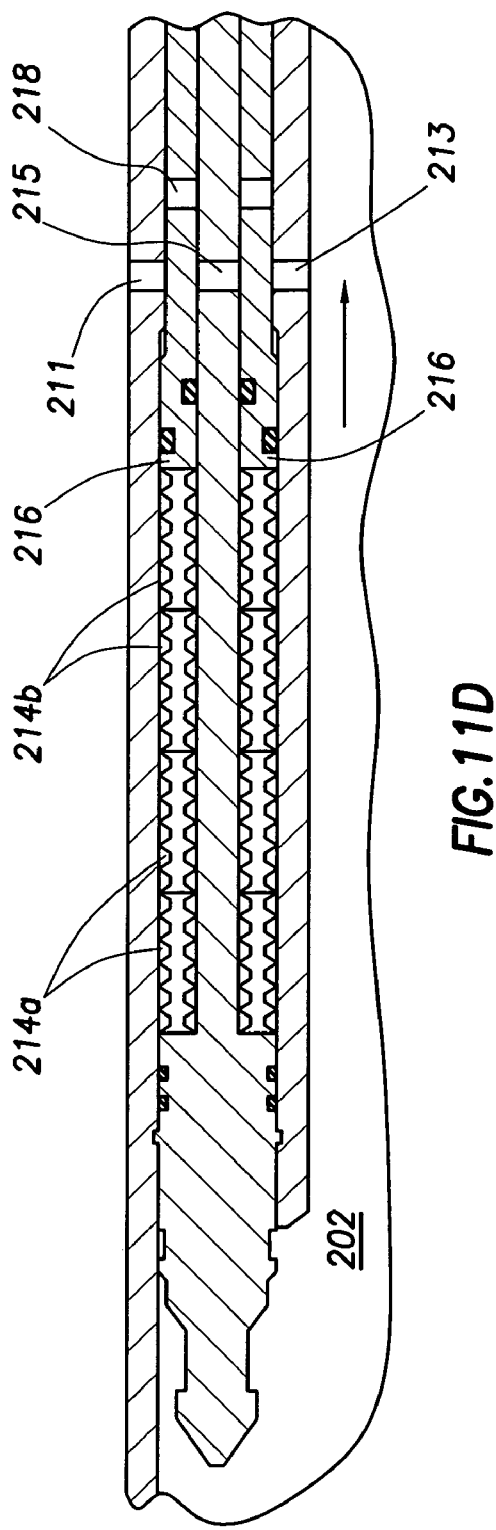

FIGS. 11B–11D illustrate three operating modes of an embodiment of the brain 210 shown in FIG. 11A. The end of brain 210 is shaped to fit within the end of a tool (not shown) that may be employed to position brain 210 within and remove brain 210 from side pocket 212. Ports 211 and 213 are disposed in side pocket 212 for allowing material such as steam to flow into and out of brain 210. The steam may pass into the brain via inlet port 213 and may exit the brain via outlet port 211. A central region 217 of brain 210 comprising a central port 215 through which material may pass extends along a common axis with inlet port 213 and outlet port 211. The brain 210 comprises one or more expansion chambers that encircle central region 217, a slidable sleeve 216 laterally adjacent to expansion chambers 214, and a spring 220 adjacent to an end of slidable sleeve 216 opposite from the expansion chambers. The brain 210 further may include primary seals 222 (e.g., metal-to-metal seals) between slidable sleeve 216 and pocket 212. It may also include seals 232 such as o-rings that act as secondary seals and/or as debris barriers to prevent fluid from entering the expansion chamber and spring areas. Seals such as o-rings or debris barriers also may be disposed above the expansion chambers and below the spring for the same purpose. The seals 222 and 232 may include connecters for attachment to pocket 212, or alternatively they may be molded to slidable sleeve 216.

The expansion chambers 214 may expand and contract in response to changes in temperature. It is understood that the number of expansion chambers could vary with the application and/or design of the brain. They have flexible walls and are filled with a solid, a liquid, or a gas that changes phase or expands at a higher temperature. For example, expansion chambers 214 may be filled with different liquids having different boiling points. Thus, the liquids in expansion chambers 214 may vaporize when heated to a temperature above their respective boiling points, causing the flexible walls to expand. The expansion chambers 214 may also contract if their temperature falls below the respective boiling points of the gases therein, causing the gases to liquidize. In alternative embodiments, expansion chambers 214 may be substituted with other types of expandable members such as pistons. The slidable sleeve 216 can move in response to the expansion and contraction of expansion chambers 214. Also, slidable sleeve 216 comprises a hole 218 for controlling the flow of steam through ports 211, 213, and 215 by alignment or mis-alignment with those ports. The hole 218 and ports 211, 213, and 215 may have a special coating thereon (e.g., a nitride coating) or may be made of a special material (e.g., tungsten carbide) to prevent erosion due to, for example, fluid cutting and/or wear). The spring 220 places a biasing force against slidable sleeve 216 and expansion chambers 214. The spring 220 is initially in its normal biasing position before steam is pumped through flow passage 202 (see FIG. 11A). In alternative embodiments, spring 220 may be substituted with other types of expandable members such as pistons. The TCV may also include a nut (not shown) that can be adjusted (e.g., before placing brain 210 in side pocket 212) to cause movement of the slidable sleeve 216 to close off ports 211, 213, and 215 at a certain temperature.

In a first operation mode of brain 210 shown in FIG. 11B, the temperature of a fluid entering the TCV is initially below a first set point temperature (e.g., 300° F.). This fluid may originate from a boiler that converts water into steam; however, as the steam passes from the boiler to the TCV via a steam line, a portion of the steam may cool to below its boiling point temperature and condense. As such, the fluid passing through TCV 40 initially may contain primarily water and may eventually contain steam and mostly condensate. The temperature within brain 210 is thus insufficient to cause the liquids within expansion chambers 214 to vaporize. Thus, slidable sleeve 216 remains in its original position at which hole 218 is mis-aligned to the left of ports 211, 213, and 215 such that fluid cannot flow through brain 210 and into an adjacent wellbore. The brain 210 may be maintained in this closed position until the quality of the steam passing into the TCV improves and no longer contains undesirable amounts of condensate or water droplets, thus ensuring that it will adequately heat the oil in an adjacent subterranean formation.

As shown in FIG. 11C, once the temperature of the steam and the operation temperature of the TCV as affected by a surrounding temperature reach the first set point temperature, brain 210 enters a second operation mode. By way of example, the liquid in the first two expansion chambers 214a vaporize, causing the walls of those chambers to expand toward slidable sleeve 216. As such, slidable sleeve 216 moves toward spring 220, which contracts in response to the force of slidable sleeve 216. As a result of the movement of slidable sleeve 216, hole 218 becomes aligned with ports 211, 213, and 215, thereby allowing the steam to pass from flow passage 202 through brain 210 and into the wellbore as shown by arrow 219. The steam within the TCV thus becomes injected into the wellbore where it can migrate into the subterranean formation and thermally stimulate the movement of oil therein. In an alternative embodiment, expansion chambers 214 may be filled with a material that does not go through a phase change at a particular temperature but instead expands at a near-linear rate as the temperature increases. In this case, the set point temperature may include a range of temperatures over which ports 211, 213, and 215 gradually open and close.

At some point, the steam within the TCV may reach a second set point temperature (e.g., 500° F.) higher than the first set point temperature. To avoid the formation of hot spots within the wellbore, the injection of such hot steam into the wellbore is stopped by the brain 210 switching to a third operation mode depicted in FIG. 1D. By way of example, the liquid within expansion chambers 214b vaporizes such that those chambers expand toward slidable sleeve 216. The liquid within expansion chambers 214b has a higher boiling point than the liquid within expansion chambers 214a, which expanded at a lower set point temperature. The force applied against slidable sleeve 216 by expansion chambers 214b causes slidable sleeve 216 to advance further. As a result of the movement of slidable sleeve 216, hole 218 becomes mis-aligned to the right of ports 211, 213, and 215 such that those ports become blocked and brain 210 no longer releases steam into the wellbore. While the hot steam within the TCV no longer can flow into the wellbore, it can flow downstream through the steam line to other TCV's. If the temperature of the steam cools back to the second set point temperature, brain 210 may switch back to the second operation mode. The brain 210 also can switch back to the first operation mode when the temperature falls below the first set point temperature.

Figure 11E:
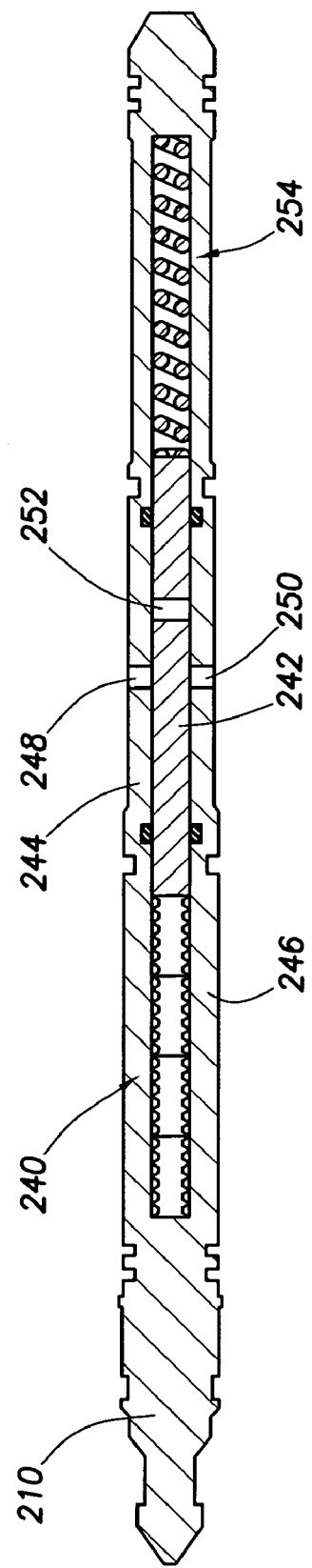

Turning to FIG. 11E, another embodiment of brain 210 is depicted. In this embodiment, brain 210 includes expansion chambers 240, a sliding or spool 242, and a spring 254 in its central region between an upper region 244 and a lower region 246. The upper and lower regions comprise ports 248 and 250, respectively, aligned along a common axis. As in the other embodiment of brain 210, expansion chambers 240 can expand and contract in response to temperature changes, thus causing the movement of sliding or spool 242 toward or away from spring 254. In this manner, a hole 252 in sliding or spool 242 may become aligned with or misaligned with ports 248 and 250, thereby regulating the flow of material through brain 210 and into an adjacent wellbore. The brain 210 may further comprise sealing elements between various components as described previously. It is understood that the previously described TCV's, including the TCV's shown in FIGS. 1A–1C and 2A–2C could also configured for use as a brain in a side pocket.

In alternative embodiments, power may be supplied to the brain using a hydraulic or electrical line running from the surface down to the brain. This power is not used to control the brain but instead acts to amplify the response of the brain to sensed temperature changes.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, the embodiments may be made to function at one or more set points. Use of the term "optionally" with respect to any element of a claim is intended to mean that the subject element is required, or alternatively, is not required. Both alternatives are intended to be within the scope of the claim. Direction terms in this patent application, such as "left", "right", "upper", "lower", "above", "below", etc., are not intended to be limiting and are used only for convenience in describing the embodiments herein. Further, it is understood that the various embodiments described herein may be utilized in various configurations and in various orientations, such as inclined, inverted, horizontal, vertical, etc., as would be apparent to one skilled in the art.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore, comprising: using a thermally-controlled tool in the wellbore; wherein the tool comprises a thermally-controlled valve; and wherein a plurality of thermally-controlled valves are arranged in the wellbore to achieve a substantially uniform temperature profile in a portion of the wellbore by controlling the injection of steam into the wellbore.

2. The method of claim 1, wherein the thermally-controlled valve is used to control the flow of material into, through, or from the wellbore.

3. The method of claim 2, wherein the material comprises hydrocarbons, water, steam, surfactants, polymers, or combinations thereof.

4. The method of claim 2, wherein the wellbore is arranged in an SAGD configuration, a multilateral wellbore configuration, or a common wellbore configuration.

5. The method of claim 2, wherein the thermally-controlled valve comprises a valve body comprising an injection port for allowing passage of the material into or out of the wellbore.

6. The method of claim 5, wherein the thermally-controlled valve further comprises an opening/closing mechanism for regulating flow through the injection port in response to changes in temperature.

7. The method of claim 6, wherein the opening/closing mechanism is located in a side pocket of the valve.

8. The method of claim 6, wherein the opening/closing mechanism comprises a material capable of expanding and contracting to regulate flow through the injection port in response to changes in temperature.

9. The method of claim 6, wherein the opening/closing mechanism comprises at least one expansion chamber capable of expanding and contracting in response to changes in temperature.

10. The method of claim 9, wherein the opening/closing mechanism comprises a slidable sleeve near the expansion chamber, the slidable sleeve being capable of moving in response to the expansion and contraction of the expansion chamber.

11. The method of claim 10, wherein the opening/closing mechanism comprises an expandable member near an end of the slidable sleeve opposite from the expansion chamber, and wherein the slidable sleeve is capable of moving in response to the expansion and contraction of the expandable member.

12. The method of claim 11, wherein the expandable member comprises a spring or a piston.

13. The method of claim 11, wherein a hole in the slidable sleeve becomes mis-aligned with the injection port when a detected temperature becomes about less than or equal to a set point temperature, thereby reducing flow through the injection port.

14. The method of claim 11, wherein a hole in the slidable sleeve becomes aligned with the injection port when a detected temperature becomes about equal to a set point temperature, thereby increasing flow through the injection port.

15. The method of claim 11, wherein a hole in the slidable sleeve becomes mis-aligned with the injection port when a detected temperature becomes about greater than or equal to a set point temperature, thereby reducing flow through the injection port.

16. The method of claim 11, wherein the valve body comprises left and right return ports for allowing passage of the material into or out of the wellbore.

17. The method of claim 16, wherein the left return port is laterally offset from a left side of the injection port and the right return port is laterally offset from the right side of the injection port.

18. The method of claim 17, wherein a hole in the slidable sleeve becomes aligned with the left return port and mis-aligned with the injection port and the right return port when a detected temperature becomes about less than or equal to a set point temperature.

19. The method of claim 17, wherein a hole in the slidable sleeve becomes aligned with the injection port and mis-aligned with the left and right return ports when a detected temperature becomes about equal to a set point temperature.

20. The method of claim 17, wherein a hole in the slidable sleeve becomes aligned with the right return port and mis-aligned with the injection port and the left return port when a detected temperature becomes about greater than or equal to a set point temperature.

21. The method of claim 10, further comprising adjusting a nut of the thermally-controlled valve to cause the slidable sleeve to move and thereby adjust the regulation of flow through the injection port.

22. The method of claim 1, wherein the injection of the steam heats oil in an adjacent subterranean zone, thereby decreasing a viscosity of the oil.

23. The method of claim 1, wherein the thermally-controlled valve comprises a balanced pressure thermostatic valve, a bimetallic valve, a bi-metal reed valve, a bi-metal sliding valve, a concentric sleeve valve, a variable-orifice radial valve, a variable-orifice radial valve, or combinations thereof.

24. The method of claim 1, wherein the thermally-controlled valve is connected to a steam line for injecting the steam into the wellbore.

25. The method of claim 1, wherein the thermally-controlled valve comprises a brain for regulating the flow of material through the valve and a side pocket for holding the brain.

26. The method of claim 25, wherein a tool is used to position the brain in the side pocket.

27. The method of claim 26, wherein the tool is used to retrieve the brain from the side pocket.

28. A method of servicing a wellbore, comprising: using a thermally-controlled tool in the wellbore; wherein the tool comprises a thermally-controlled valve; wherein a plurality of thermally-controlled valves are arranged in a production conduit disposed in the wellbore to control the recovery of material from the wellbore; and wherein the thermally-controlled valves restrict the flow of steam out of the wellbore.

29. A thermally-controlled valve for injecting material into a wellbore, comprising:
    (a) a valve body comprising an injection port for allowing the material to flow into or out of the wellbore; and
    (b) an opening/closing mechanism for regulating flow through the injection port in response to a change in temperature;
    wherein the opening/closing mechanism is adapted to become mis-aligned with the injection port when a temperature of the material becomes about less than or equal to a first set point temperature or about greater than or equal to a second set point temperature.

30. The thermally-controlled valve of claim 29, wherein the opening/closing mechanism is located in a side pocket of the valve.

31. The thermally-controlled valve of claim 29, further comprising connectors for coupling the valve body to a downhole conduit or tool.

32. The thermally-controlled valve of claim 31, wherein the downhole conduit comprises a steam delivery conduit, an oil production conduit, or combinations thereof.

33. The thermally-controlled valve of claim 29, wherein the valve body is threaded to couple with a downhole conduit or tool.

34. The thermally-controlled valve of claim 29, wherein the opening/closing mechanism comprises a material capable of expanding and contracting to regulate flow through the injection port in response to changes in temperature.

35. The thermally-controlled valve of claim 29, wherein the opening/closing mechanism comprises at least one expansion chamber, the expansion chamber being capable of expanding and contracting in response to changes in temperature.

36. The thermally-controlled valve of claim 35, wherein the opening/closing mechanism comprises a slidable sleeve near the expansion chamber, the slidable sleeve being capable of moving in response to the expansion and contraction of the expansion chamber.

37. The thermally-controlled valve of claim 36, comprising a nut that is capable of being adjusted to cause the slidable sleeve to move and thereby adjust the regulation of flow through the injection port.

38. The thermally-controlled valve of claim 36, wherein the opening/closing mechanism comprises an expandable member near an end of the slidable sleeve opposite from the expansion chamber, the slidable sleeve being capable of moving in response to the expansion and contraction of the expandable member.

39. The thermally-controlled valve of claim 38, wherein the expandable member comprises a spring or a piston.

40. The thermally-controlled valve of claim 38, wherein the slidable sleeve comprises a hole for controlling flow through the injection port by alignment or mis-alignment with the injection port.

41. The thermally-controlled valve of claim 29, comprising a brain for regulating the flow of material through the valve and a side pocket for holding the brain.

42. The thermally-controlled valve of claim 41, wherein the brain is capable of being removed from the side pocket.

43. A thermally-controlled valve for injecting material into a wellbore, comprising:
(a) a valve body comprising an injection port for allowing the material to flow into or out of the wellbore; and
(b) an opening/closing mechanism for regulating flow through the injection port in response to a change in temperature;
wherein the valve body comprises left and right return ports for allowing material to flow into a return line for conveying the material from the wellbore.

44. The thermally-controlled valve of claim 43, wherein the opening/closing mechanism is adapted to become aligned with the injection port when a temperature of the material becomes about equal to a set point temperature.

45. The thermally-controlled valve of claim 43, wherein the material comprises condensate.

46. The thermally-controlled valve of claim 43, wherein the left return port is laterally offset from a left side of the injection port and the right return port is laterally offset from a right side of the injection port.

47. The thermally-controlled valve of claim 46, wherein the slidable sleeve comprises a hole for controlling flow through the injection port and the right and left return ports by alignment or mis-alignment therewith.

48. The thermally-controlled valve of claim 46, wherein the opening/closing mechanism is adapted to become aligned with the left return port and mis-aligned with the injection port and the right return port when a temperature of the material becomes about less than or equal to a set point temperature.

49. The thermally-controlled valve of claim 46, wherein the opening/closing mechanism is adapted to become aligned with the injection port and mis-aligned with the right and left return ports when a temperature of the material becomes about equal to a set point temperature.

50. The thermally-controlled valve of claim 46, wherein the opening/closing mechanism is adapted to become aligned with the right return port and mis-aligned with the left return port and the injection port when a temperature of the material becomes about greater than or equal to a set point temperature.

51. A system for regulating the flow of material in a wellbore, comprising:
(a) a downhole conduit for conveying the material into, through, or out of the wellbore; and
(b) at least one thermally-controlled valve for regulating the flow of the material, the thermally-controlled valve being connected to the conduit;
wherein the thermally-controlled valve comprises a valve body comprising an injection port for allowing the material to flow into or out of the wellbore;
wherein the thermally-controlled valve further comprises an opening/closing mechanism for regulating flow through the injection port in response to changes in temperature; and
wherein the opening/closing mechanism is located in a side pocket of the valve.

52. A system for regulating the flow of material in a wellbore, comprising:
(a) a downhole conduit for conveying the material into, through, or out of the wellbore;
(b) at least one thermally-controlled valve for regulating the flow of the material, the thermally-controlled valve being connected to the conduit; and
(c) a return conduit for returning material from the wellbore, the thermally-controlled valve being connected to the return conduit;
wherein the thermally-controlled valve comprises a valve body comprising an injection port for allowing the material to flow into or out of the wellbore; and
wherein the thermally-controlled valve further comprises an opening/closing mechanism for regulating flow through the injection port in response to changes in temperature.

53. The system of claim 52, wherein the material comprises hydrocarbons, water, steam, surfactants, polymers, or combinations thereof.

54. The system of claim 52, wherein the downhole conduit comprises a steam delivery conduit, an oil production conduit, or combinations thereof.

55. The system of claim 52, wherein the wellbore is arranged in an SAGD configuration, a multilateral wellbore configuration, or a common wellbore configuration.

56. The system of claim 52, wherein the thermally-controlled valve comprises a balanced pressure thermostatic valve, a bimetallic valve, a bi-metal reed valve, a bi-metal sliding valve, a concentric sleeve valve, a variable-orifice radial valve, and a variable-orifice radial valve, or combinations thereof.

57. The system of claim 52, wherein the material comprises condensate.

58. The system of claim 52, wherein the valve body further comprises left and right return ports for allowing the fluid to flow into the return conduit.

59. The system of claim 58, wherein the left return port is laterally offset from a left side of the injection port and the right return port is laterally offset from a right side of the injection port.

60. The system of claim 59, wherein the opening/closing mechanism is adapted to become aligned with the left return port and become mis-aligned with the injection port and the right return port when a temperature of the material becomes about less than or equal to a set point temperature.

61. The system of claim 59, wherein the opening/closing mechanism is adapted to become aligned with the injection port and become mis-aligned with the right and left return ports when a temperature of the material becomes about equal to a set point temperature.

62. The system of claim 59, wherein the opening/closing mechanism is adapted to become aligned with the right return port and become mis-aligned with the left return port and the injection port when a temperature of the material becomes about greater than or equal to a set point temperature.

63. A system for regulating the flow of material in a wellbore, comprising:
(a) a downhole conduit for conveying the material into, through, or out of the wellbore; and
(b) at least one thermally-controlled valve for regulating the flow of the material, the thermally-controlled valve being connected to the conduit;
wherein the thermally-controlled valve comprises a brain for regulating the flow of material through the valve and a side pocket for holding the brain.

64. The system of claim 63, wherein the brain is capable of being removed from the side pocket.

65. A thermally-controlled downhole tool comprising a control element responsive to a change in temperature, and wherein the control element controls a power source.

66. The tool of claim 65, wherein the control element controls the flow of fluid into, out of, or through a wellbore.

67. A thermally-controlled downhole tool comprising a control element responsive to a change in temperature, wherein the control element further comprises a temperature sensor coupled to an actuator or an amplifier, and wherein the actuator is electrically, hydraulically, or optically driven or produces an electrical, hydraulic, or optical output.

68. A thermally-controlled downhole tool comprising a control element responsive to a change in temperature, wherein the control element further comprises a temperature sensor coupled to an actuator or an amplifier, and wherein the control element is capable of sending a signal to the actuator or the amplifier.

69. The tool of claim 68, wherein the actuator is mechanically driven or produces a mechanical output.

70. The tool of claim 68, further comprising an electrical, hydraulic, or optical line for transmitting the signal.

71. The tool of claim 68, comprising a thermally-controlled valve.

72. The tool of claim 71, wherein the thermally-controlled valve is capable of controlling the flow of material downhole.

73. The tool of claim 71, wherein the thermally-controlled valve is actuated between an open position, a closed position and intermediate positions therebetween.

74. A thermally-controlled downhole tool comprising a control element responsive to a change in temperature, wherein the control element further comprises a temperature sensor coupled to an actuator or an amplifier, and wherein the amplifier comprises a servomechanism.

75. A thermally-controlled downhole tool comprising a control element responsive to a change in temperature, wherein the control element comprises a mechanical element actuated by changes in temperature, wherein the mechanical element comprises a thermally expandable material wherein the polymer comprising PEEK.

76. The tool of claim 75, wherein the thermally expandable material comprises a polymer, a composite material, a hydrocarbon-derived material, an organic material, an inorganic material, a metal, a bi-metal, or combinations thereof.

77. The tool of claim 76, wherein the composite comprises PEEK combined with glass fibers.

78. A thermally-controlled downhole tool comprising a control element responsive to a change in temperature, wherein the control element comprises a mechanical element actuated by changes in temperature, and wherein the mechanical element comprises one or more thermal expansion chambers.

79. The tool of claim 78, wherein the thermal expansion chamber is filled with an expanding and contracting material.

80. A method of operating a downhole tool, comprising: thermally-controlling the tool, wherein the thermostatic-control is implemented via thermal expansion of a mechanical element of the tool, wherein the mechanical element comprises a thermally expandable material, and wherein the mechanical element comprises one or more thermal expansion chambers.

81. The method of claim 80, wherein the thermostatic-control further comprises sensing a temperature and controlling the tool in response to the sensed temperature.

82. The method of claim 81, wherein the flow of fluid into, out of, or through a wellbore or a conduit is controlled.

83. The method of claim 81, further comprising actuating an element of the tool in response to the sensed temperature.

84. The method of claim 83, wherein the element is actuated using mechanical means, electrical means, hydraulic means, optical means, or combinations thereof.

85. The tool of claim 80, wherein the thermally expandable material comprises a polymer, a metal, a bi-metal, a composite, a hydrocarbon-derived material, an organic material, an inorganic material, or combinations thereof.

86. The tool of claim 80, wherein the thermal expansion chamber is filled with an expanding and contracting fluid or solid.

87. The method of claim 80, wherein the tool comprises a thermally-controlled valve.

88. The method of claim 87, wherein the thermally-controlled valve is capable of controlling the flow of material downhole.

89. The tool of claim 87, wherein the thermally-controlled valve is actuated between an open position, a closed position, and intermediate positions therebetween.

* * * * *

UNITED STATES PATENT AND TRADEMARK OFFICE
CERTIFICATE OF CORRECTION

PATENT NO. : 7,032,675 B2  Page 1 of 1
APPLICATION NO. : 10/681020
DATED : April 25, 2006
INVENTOR(S) : David Joe Steele et al.

It is certified that error appears in the above-identified patent and that said Letters Patent is hereby corrected as shown below:

Claim 75, Col. 23, Line 40, replace "material wherein the polymer comprising PEEK" with --material comprising PEEK--.

Signed and Sealed this

Ninth Day of June, 2009

JOHN DOLL
*Acting Director of the United States Patent and Trademark Office*